US011953735B2

(12) United States Patent
Verheyden et al.

(10) Patent No.: US 11,953,735 B2
(45) Date of Patent: Apr. 9, 2024

(54) MULTI-FIBER ASSEMBLY FOR A FERRULE-LESS FIBER OPTIC CONNECTOR

(71) Applicant: COMMSCOPE TECHNOLOGIES LLC, Hickory, NC (US)

(72) Inventors: Danny Willy August Verheyden, Gelrode (BE); Jozef Christiaan Mathieu Versleegers, Bree (BE); Marc Eugène Willem Bervoets, Hasselt (BE); Michael Maris, Paal (BE); Erwin Junius, Termelo (BE); Walter Mattheus, Herent (BE)

(73) Assignee: CommScope Technologies LLC, Hickory, NC (US)

(*) Notice: Subject to any disclaimer, the term of this patent is extended or adjusted under 35 U.S.C. 154(b) by 357 days.

(21) Appl. No.: 17/423,311

(22) PCT Filed: Jan. 15, 2020

(86) PCT No.: PCT/US2020/013751
§ 371 (c)(1),
(2) Date: Jul. 15, 2021

(87) PCT Pub. No.: WO2020/150395
PCT Pub. Date: Jul. 23, 2020

(65) Prior Publication Data
US 2022/0082763 A1 Mar. 17, 2022

Related U.S. Application Data

(60) Provisional application No. 62/794,129, filed on Jan. 18, 2019.

(51) Int. Cl.
*G02B 6/38* (2006.01)
*G02B 6/36* (2006.01)
*G02B 6/40* (2006.01)

(52) U.S. Cl.
CPC ........ *G02B 6/3885* (2013.01); *G02B 6/3809* (2013.01); *G02B 6/40* (2013.01); *G02B 6/3636* (2013.01)

(58) Field of Classification Search
CPC .. G02B 6/3636; G02B 6/3809; G02B 6/3885; G02B 6/40
See application file for complete search history.

(56) References Cited

U.S. PATENT DOCUMENTS

| 6,085,003 A | 7/2000 | Knight |
| 6,234,681 B1 * | 5/2001 | Shahid ................ G02B 6/3833 |
| | | 385/65 |

(Continued)

FOREIGN PATENT DOCUMENTS

| WO | 2012/112344 A1 | 8/2012 |
| WO | 2013/117598 A2 | 8/2013 |

(Continued)

OTHER PUBLICATIONS

International Search Report and Written Opinion of the International Searching Authority for International Patent Application No. PCT/US2020/013751 dated May 12, 2020, 9 pages.

*Primary Examiner* — Daniel Petkovsek
(74) *Attorney, Agent, or Firm* — MERCHANT & GOULD P.C.

(57) ABSTRACT

The present disclosure relates to a ferrule-less multi-fiber connector having features adapted to compensate or adjust for angular misalignment that may occur when the multi-fiber connector is optically connected with a corresponding ferrule-less multi-fiber connector. In one example, the features for adjusting for angular misalignment are integrated in a multi-fiber holder that mounts within a connector body of the fiber optic connector.

23 Claims, 25 Drawing Sheets

(56) References Cited

U.S. PATENT DOCUMENTS

| | | |
|---|---|---|
| 7,267,491 B2 | 9/2007 | Luther et al. |
| 8,517,614 B1 * | 8/2013 | Wach .................. G02B 6/38 |
| | | 385/59 |
| 8,870,466 B2 | 10/2014 | Lu |
| 9,575,272 B2 | 2/2017 | Ott |
| 9,829,643 B2 | 11/2017 | Kadar-Kallen et al. |
| 2006/0013538 A1 | 1/2006 | Hodge et al. |
| 2013/0170797 A1 | 7/2013 | Ott |
| 2014/0072265 A1 | 3/2014 | Ott |
| 2017/0031106 A1 | 2/2017 | Takano et al. |
| 2017/0276883 A1 | 9/2017 | Watte et al. |
| 2018/0329155 A1 | 11/2018 | Verheyden |
| 2019/0346627 A1 | 11/2019 | Zimmel et al. |

FOREIGN PATENT DOCUMENTS

| | | |
|---|---|---|
| WO | 2016/043922 A1 | 3/2016 |
| WO | 2016/100384 A1 | 6/2016 |
| WO | 2016/205201 A1 | 12/2016 |
| WO | 2017/081306 A1 | 5/2017 |
| WO | 2017/223072 A1 | 12/2017 |
| WO | 2018/017883 A1 | 1/2018 |
| WO | 2018/020022 A1 | 2/2018 |
| WO | 2018/144128 A2 | 8/2018 |
| WO | 2019/079326 A1 | 4/2019 |
| WO | 2020/046709 A1 | 3/2020 |

* cited by examiner

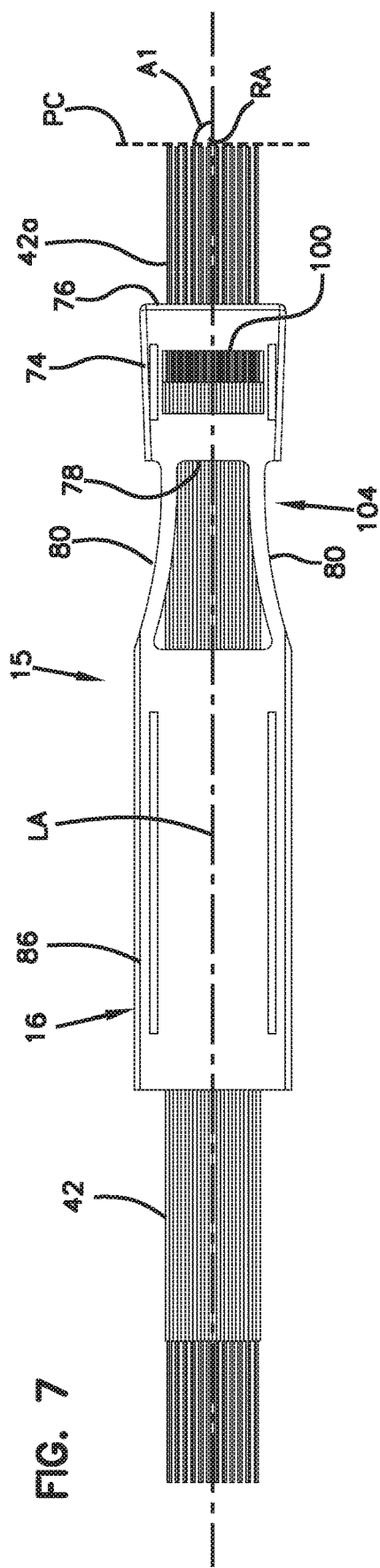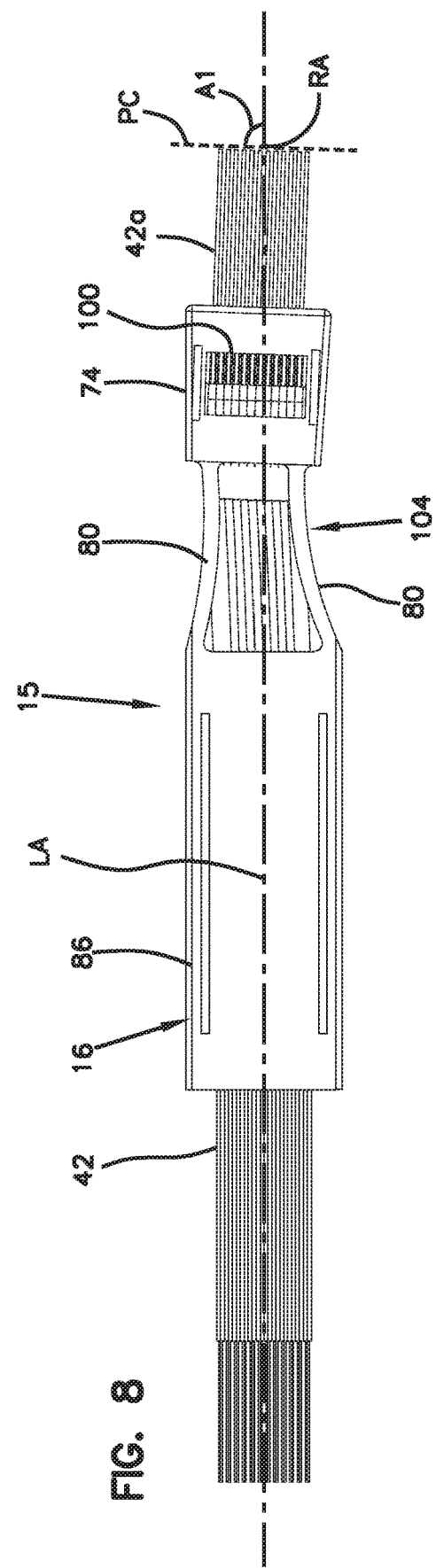

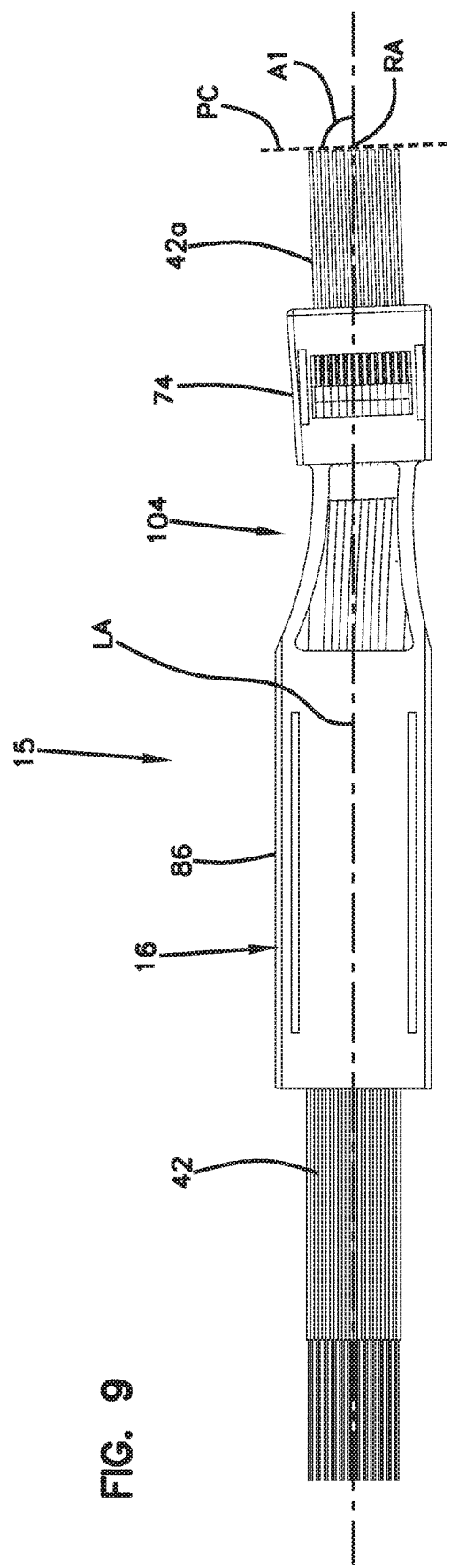

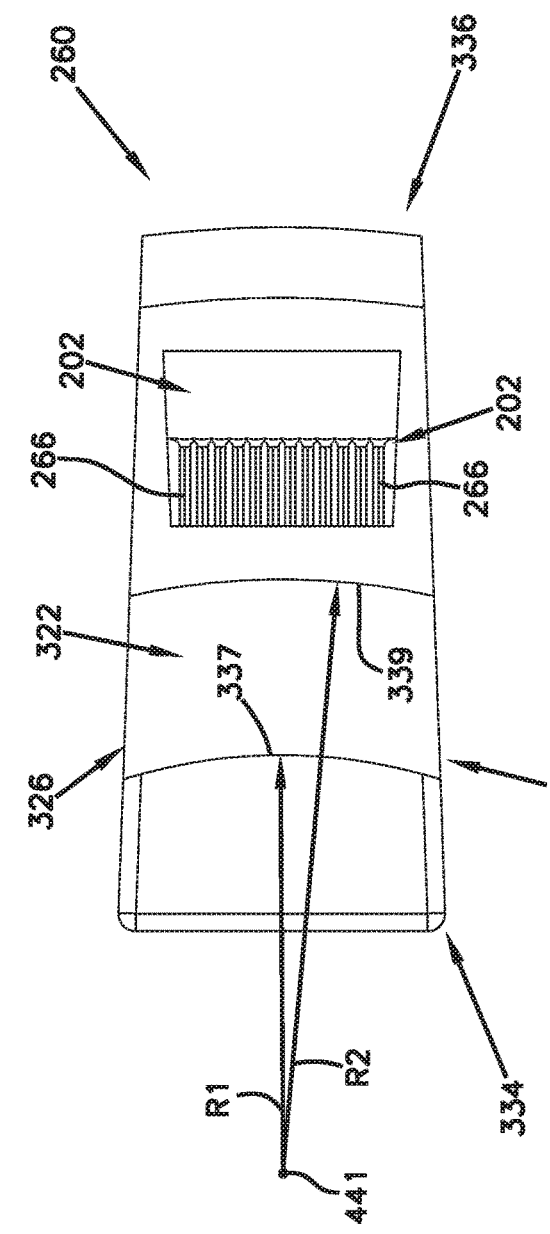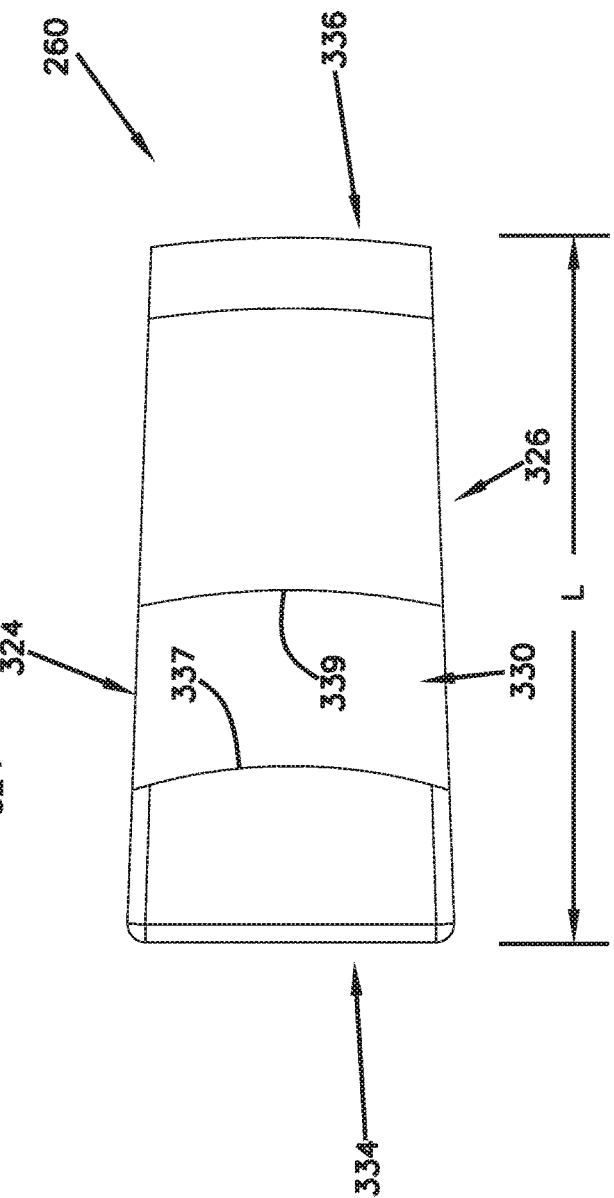

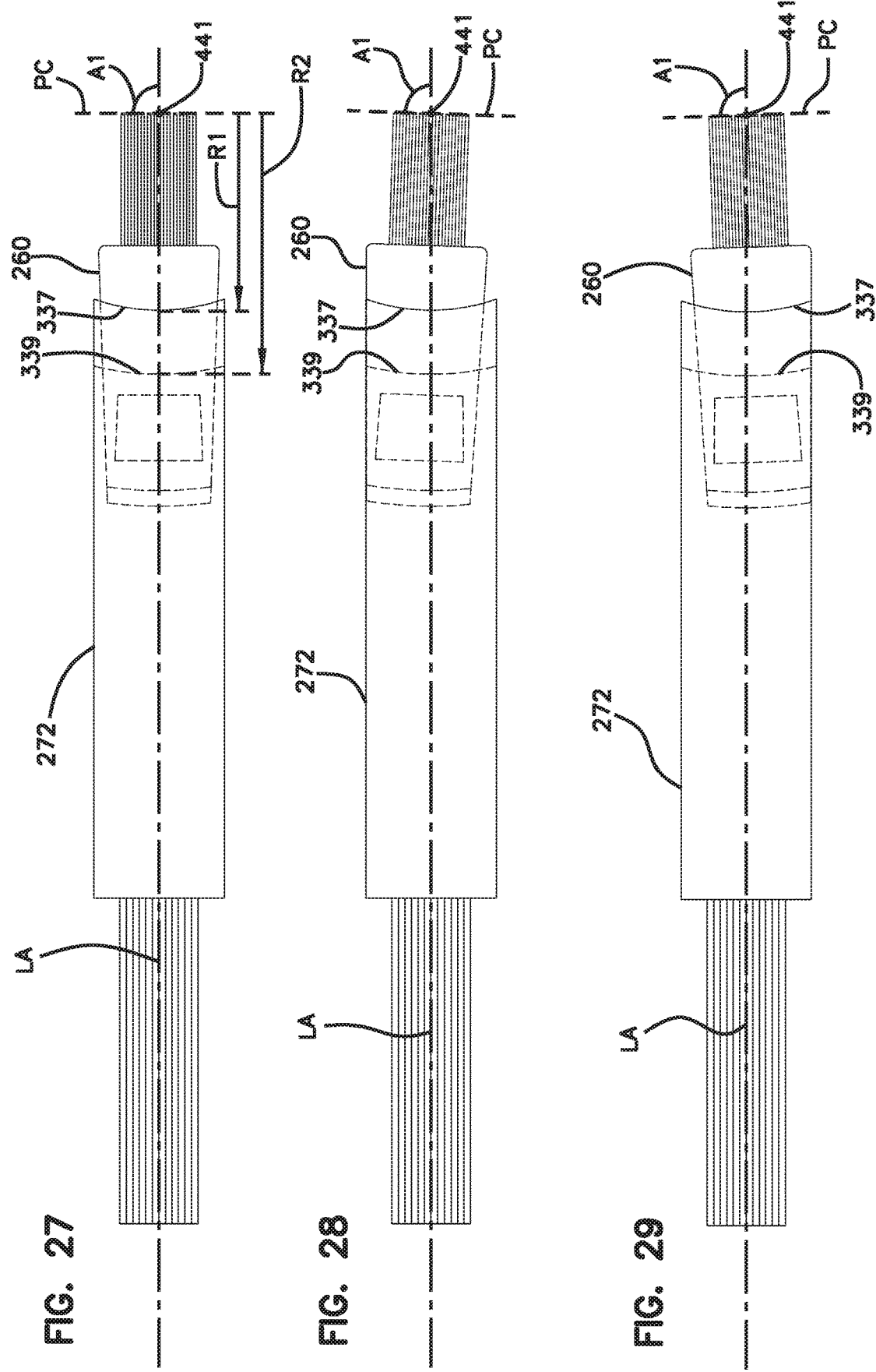

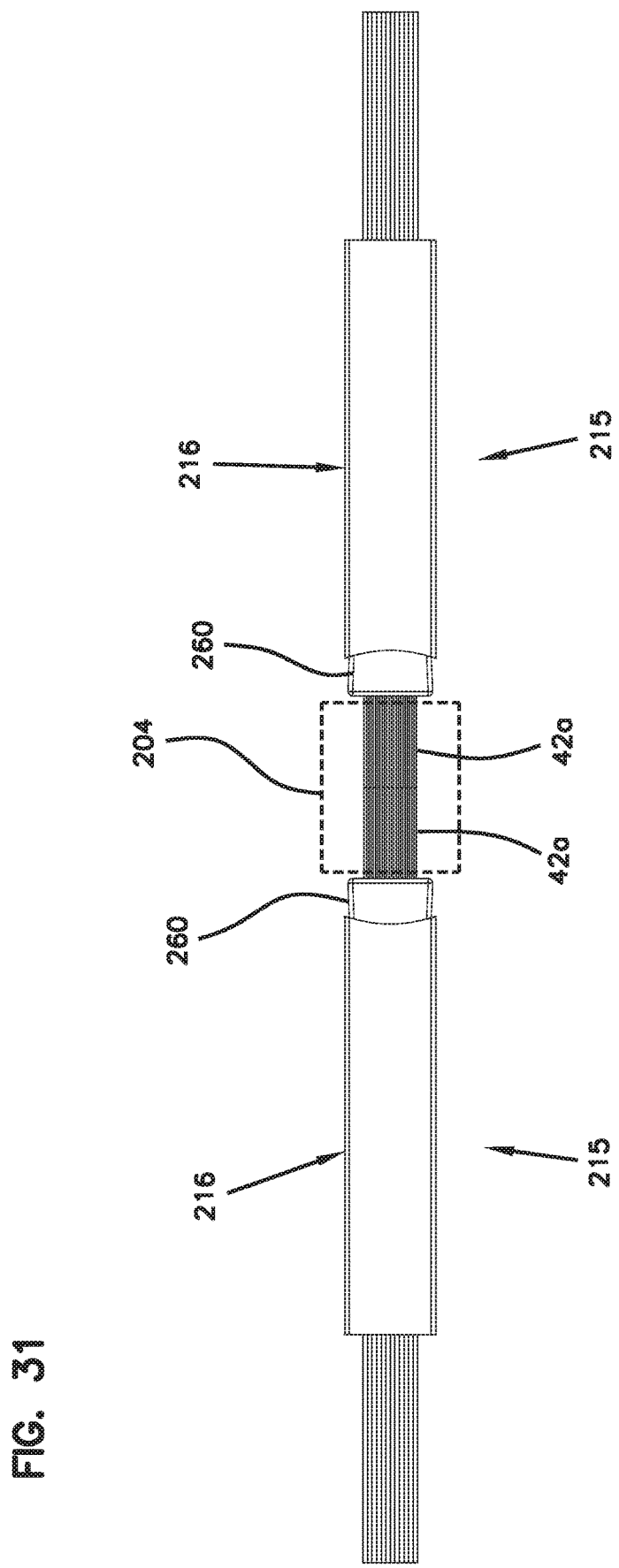

MULTI-FIBER ASSEMBLY FOR A FERRULE-LESS FIBER OPTIC CONNECTOR

This application is a National Stage Application of PCT/US2020/013751, filed on Jan. 15, 2020, which claims the benefit of U.S. Patent Application Ser. No. 62/794,129, filed on Jan. 18, 2019, the disclosures of which are incorporated herein by reference in their entireties. To the extent appropriate, a claim of priority is made to each of the above disclosed applications.

TECHNICAL FIELD

The present invention relates to multi-fiber connectivity. More particularly, the present invention relates fiber holder configurations for multi-fiber connectors.

BACKGROUND

Fiber optic connectors are commonly used in optical fiber communication systems to effect demateable optical connections between waveguides such as optical fibers. A typical optical connection is made by co-axially aligning two waveguides (e.g., optical fibers) in end-to-end relation with end faces of the waveguides opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components which each hold one or more optical fibers such that the end faces of the fibers are presented for optical coupling. The ferrules of fiber optic connectors are often spring biased such that, when one connector is mated to another connector, opposing faces of the ferrules are urged together. The ferrules of ferruled connectors assist in the fiber alignment process and the fiber or fibers supported by a given ferrule are precisely positioned relative to the ferrule. For example, traditional single fiber optical connectors such as SC or LC connectors include cylindrical ferrules with optical fibers supported and precisely centered within the ferrules. To effect an optical connection between two fiber optic connectors of this type, the ferrules of the connectors are received within an alignment structure such as an alignment split-sleeve to co-axially align the ferrules and also co-axially align the optical fibers supported by the ferrules. Thus, the precision of the ferrules themselves and their relation to their corresponding optical fibers is critical to the effectiveness of the alignment process. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the fibers supported by the ferrules.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Fiber optical adapters for ferrule-less connectors can include internal fiber alignment devices configured to receive bare optical fibers of ferrule-less fiber optic connectors desired to be optically coupled together and to align the fiber tips of the fiber optic connectors to enable the transfer of optical signals there between. Example ferrule-less fiber optic connectors and/or fiber optic adapters are disclosed by PCT Publication Nos. WO 2012/112344; WO 2013/117598; WO 2017/081306; WO 2016/100384; WO 2016/043922; and U.S. Pat. Nos. 8,870,466 and 9,575,272.

SUMMARY

One aspect of the present disclosure relates to systems, devices and method for enhancing the physical contact made at a ferrule-less optical connection interface between a first plurality of optical fibers and a second plurality of optical fibers.

Another aspect of the present disclosure relates to a ferrule-less fiber optic connector including first optical fibers having unsupported fiber end portions arranged in a row. The unsupported fiber end portions are adapted to be removeably received within a fiber alignment device for aligning the fiber end portions with corresponding second optical fibers of a component to which it is desired to provide an optical coupling. The fiber end portions have tips aligned generally along a physical contact reference line. The fiber end portions project outwardly from a fiber holder of the fiber optic connector. At least a portion of the fiber holder is moveable (e.g., pivotable) along a reference plane that includes the fiber end portions to modify an interface angle of the physical contact reference line.

Another aspect of the present disclosure relates to a ferrule-less fiber optic connector including first optical fibers having unsupported fiber end portions arranged in a row. The unsupported fiber end portions are adapted to be removeably received within a fiber alignment device for aligning the fiber end portions with corresponding second optical fibers of a component to which it is desired to provide an optical coupling. The fiber end portions have tips aligned generally along a physical contact reference line. The fiber end portions project outwardly from a fiber holder of the fiber optic connector. At least a portion of the fiber holder is moveable relative to a connector body/housing of the fiber optical connector to modify an angle of the physical contact reference line relative to a central longitudinal axis of the fiber optic connector to enhance physical contact between the fiber end portions and the second optical fibers within the alignment device.

Another aspect of the present disclosure relates to a multi-fiber assembly adapted to be mounted within a multi-fiber optical connector. The multi-fiber assembly includes a rear base portion configured to mount within the multi-fiber optical connector. The rear base portion defines a central longitudinal axis of the multi-fiber assembly that extends in a forward-rearward orientation. The multi-fiber assembly also includes a front head portion coupled to the rear base portion in a manner that allows the front head portion to angularly adjust relative to the rear base portion along a reference plane that extends along the central longitudinal axis. The multi-fiber assembly includes a plurality of optical fibers fixed to the front head portion to inhibit axial movement of the optical fibers relative to the front head portion. The optical fibers include unsupported fiber end portions that project forwardly from the front head portion at least one millimeter beyond the front head portion. The unsupported fiber end portions are arranged in a row and are aligned with the reference plane. The unsupported fiber end portions include fiber tips which define a physical contact reference line within the reference plane that extends along the row of fiber tips and that extends across the central longitudinal axis. Angular adjustment of the front head portion relative to the rear base portion along the reference plane is adapted to modify an angle between the physical contact reference line and the central longitudinal axis.

A further aspect of the present disclosure relates to a multi-fiber assembly including a holder housing having a front end and an opposite rear end. A head portion of the holder housing is positioned at the front end of the holder housing. The head portion has a rear end and a front end. The head portion defines a plurality of optical fiber openings. The multi-fiber assembly also includes a plurality of optical fibers received and secured within the optical fiber openings. The holder housing includes flexible beams having forward ends coupled to the rear end of the head portion of the holder housing and rearward ends coupled to a main body portion of the holder housing. The flexible beams have lengths that extend between the head portion and the main body portion of the housing. The flexible beams are adapted to form a hinge arrangement that allows the head portion to angularly adjust relative to the main body portion.

A further aspect of the present disclosure relates to a multi-fiber assembly adapted to be mounted in a ferrule-less connector. The multi-fiber assembly includes a sleeve having a front end and an opposite rear end. The multi-fiber assembly further includes a front head disposed at the front end of the sleeve. The front head defines a plurality of optical fiber openings. The multi-fiber assembly further includes a plurality of optical fibers received within the optical fiber openings. The optical fibers are fixed relative to the front head and include forward portions that project forwardly at least 1 millimeter front the front head. The front head is adapted to pivot within the sleeve to correct any angular misalignment that may occur when the plurality of optical fibers make physical contact with other optical fibers.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a top plan view of the multi-fiber assembly of FIG. 5 in a centered configuration (i.e., a non-angularly adjusted configuration);

FIG. 8 is a top plan view of the multi-fiber assembly of FIG. 7 depicting the multi-fiber assembly in a first angularly adjusted configuration;

FIG. 9 is a top plan view of the multi-fiber assembly of FIG. 7 depicting the multi-fiber assembly in a second angularly adjusted configuration;

FIG. 24 is a top view of the front head of FIG. 21;

FIG. 25 is a bottom view of the front head of FIG. 21;

FIG. 27 is a top plan view of the multi-fiber assembly of FIG. 26 in a centered configuration (i.e., a non-angularly adjusted configuration);

FIG. 28 is a top plan view of the multi-fiber assembly of FIG. 26 depicting the multi-fiber assembly in a first angularly adjusted configuration;

FIG. 29 is a top plan view of the multi-fiber assembly of FIG. 26 depicting the multi-fiber assembly in a second angularly adjusted configuration;

FIG. 31 is a top plan view of the multi-fiber assemblies of FIG. 30 in which at least one of the multi-fiber assemblies has angularly adjusted its corresponding optical fibers to compensate for and close the angular misalignment gap of FIG. 30.

DETAILED DESCRIPTION

Figure 1:
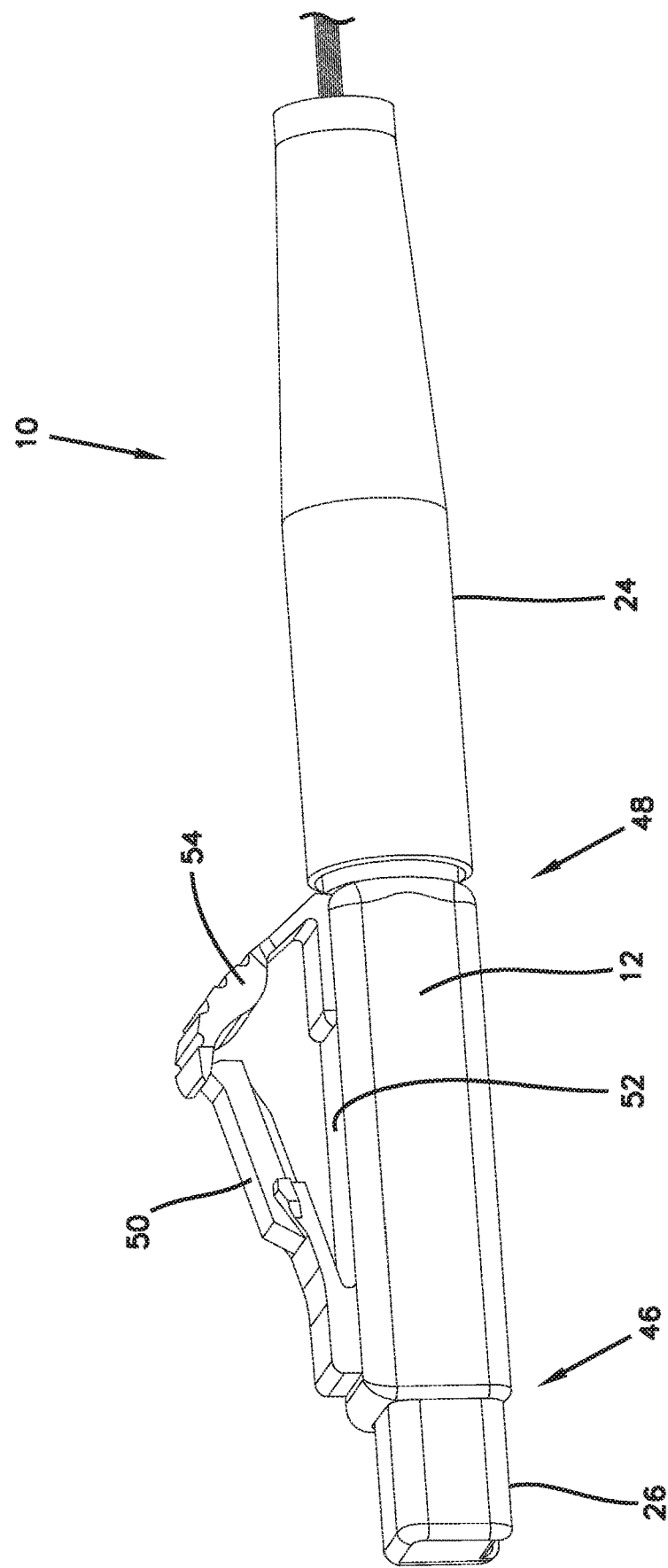
FIG. 1 is a side perspective view of a ferrule-less multi-fiber optical connector in accordance with principles of the present disclosure.
Figure 2:
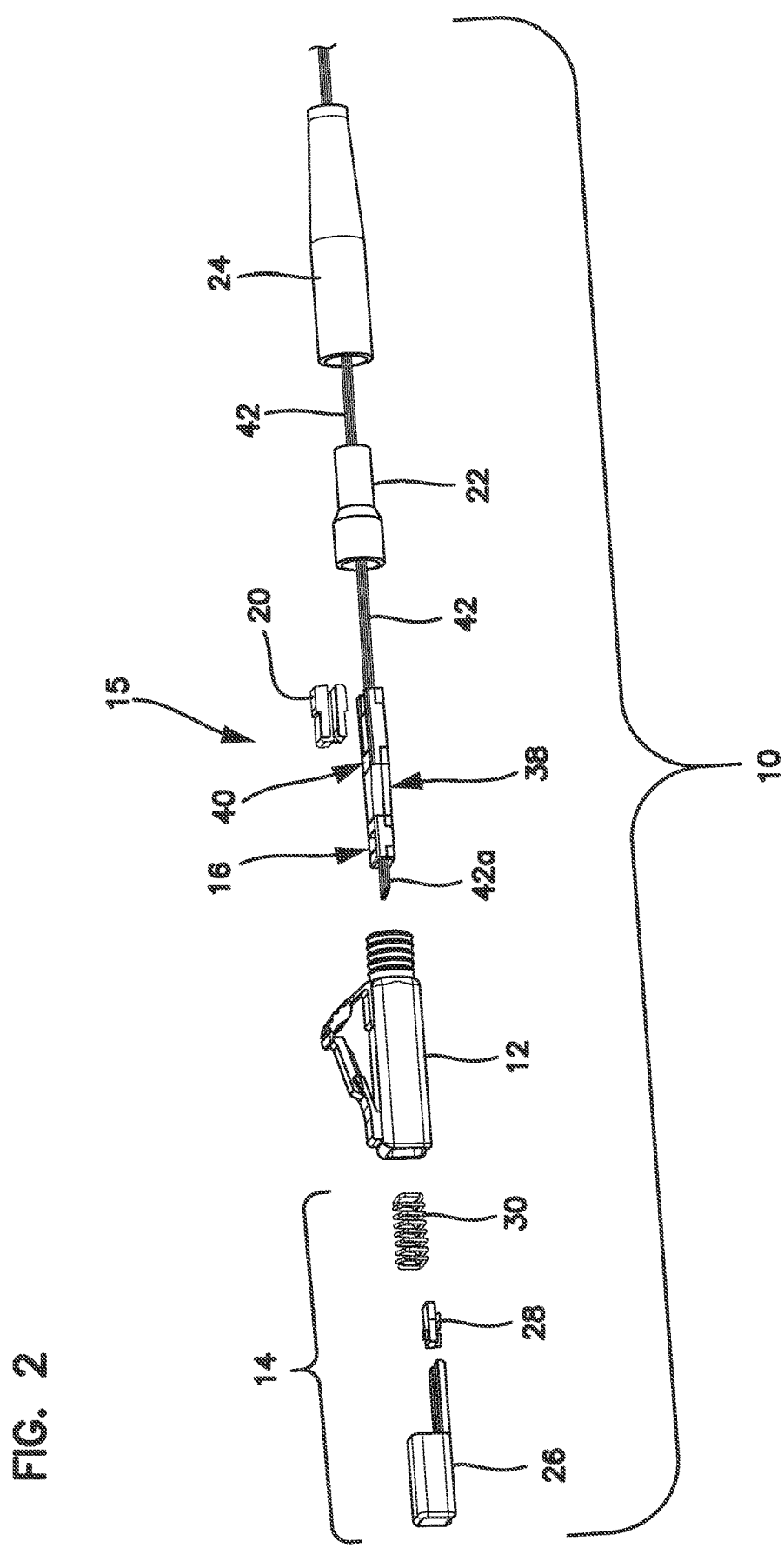
FIG. 2 is an exploded view of the ferrule-less multi-fiber optical connector of FIG. 1 showing a multi-fiber assembly in accordance with principles of the present disclosure.

The present disclosure provides for a multi-fiber optical connector having enhanced fiber adjustability during the mating process to ensure a reliable and repeatable physical contact ("PC") between the fibers of the connector and the optical pathways of a mating optical structure (e.g., the optical fibers of another fiber optic connector). The multi-fiber optical connector is a ferrule-less connector. The term "optical pathway," as used herein, refers to any medium for conducting optical signals including the following: a fiber or other waveguide; a silica or polymeric structure in a substrate; or a silica or polymeric optical component. The term "mating component" refers to an optical component or package that contains or comprises the optical pathway. For example, a mating component may be another connector, herein a "mating connector" or it may be an optical device in which the mating optical pathway is an integral component. Examples of optical devices include passive devices, such as, add/drop filters, arrayed wave guide gratings (AWGs), splitters/couplers, and attenuators, and active devices, such as, optical amplifiers, transmitters, receivers and transceivers.

For illustrative purposes, optical connectors of the present disclosure are described below mating with respect other fiber optic connectors. It should be understood, however, that the invention may be practiced in a variety of applications, for example, the connectors may be configured to mate to optical devices as described above.

Aspects of the present disclosure relate to a multi-fiber assembly that can be incorporated into a multi-fiber optical connector such as a ferrule-less multi-fiber optical connector. In certain examples, the multi-fiber assembly includes features that allow for angular adjustment of optical fibers of the multi-fiber assembly. In certain examples, the multi-fiber assembly includes a fiber holder for holding the optical fibers within the fiber optic connector. In certain examples, the fiber holder includes at least a portion that can angularly adjust relative to a connector body of the multi-fiber optical connector. In certain examples, the fiber holder includes a first portion (e.g., a head portion, a pivotal portion, an adjustable portion, etc.) that can angularly adjust relative to the connector body, and a second portion (e.g., a base portion, a main body portion, a sleeve portion, a stabilization portion, etc.) that cannot angularly adjust relative to the connector body. In certain examples, the optical fibers can be axially fixed relative to the first portion (e.g., adhesively fixed by means such as an epoxy). In certain examples, the first portion can include individual openings or grooves which each receive one of the optical fibers and function to align free ends of the optical fibers in a parallel relationship along a plane. In certain examples, the second portion can define one passage or channel through which all of the optical fibers are routed.

Referring to FIGS. 1-4, an example multi-fiber optical connector 10 is depicted. The multi-fiber optical connector 10 incorporates a multi-fiber assembly 15 (see FIGS. 2 and 4) in accordance with the principles of the present disclosure. The multi-fiber assembly 15 includes a multi-fiber holder 16 which holds a plurality of optical fibers 42. The multi-fiber holder 16 preferably has a construction for enabling the angularly adjustment of free end portions of the optical fibers 42 when the free end portions make physical contact with the free end portions of optical fibers of another multi-fiber optical connector. It will be appreciated that the physical contact between the optical fibers typically occurs within an alignment structure of a fiber optic adapter configured to receive and couple together the multi-fiber optical connectors desired to be optically connected together. Example fiber optic adapters configured to align the optical fibers of ferrule-less fiber optic connectors are disclosed by PCT International Publication No. WO 2017/081306; PCT International Publication No. WO 2018/144128; PCT International Publication No. WO 2018/020022; PCT International Application No. PCT/US2018/056120; and U.S. Provisional Patent Application No. 62/724,356, all of which are hereby incorporated by reference in their entireties.

The multi-fiber optical connector 10 includes a housing 12 (i.e., a connector body) in which the multi-fiber assembly 15 is mounted. In one example, the multi-fiber assembly is mounted within the housing 12 so as to be axially moveable relative to the housing 12. The multi-fiber optical connector 10 further includes a shroud assembly 14, a compression spring 18, a rear insert 20, a crimp sleeve 22, and a flexible, strain-relief sleeve 24 (e.g., a boot) that provides bend radius protection to an optical cable from which the optical fibers 42 originate. The compression spring 18 can be configured to spring bias/urge the fiber holder 16 in a forward direction relative to the housing 12. In certain examples, the compression spring 18 can be a leaf spring. In other examples, the compression spring 18 can be a coil spring or other type of element having elastic characteristics. The shroud assembly 14 can include a shroud body 26, a shroud lock 28, and a shroud spring 30. The shroud assembly 14 can be loaded into (e.g., snapped into) the housing 12. A dust cap (not shown) can be mounted over a front end of the shroud assembly 14. The shroud body 26, shroud lock 28, and shroud spring 30 can be pre-assembled together and then loaded into the housing 12 as a unit. In certain examples, the fiber holder 16 can hold at least two optical fibers, or at least four optical fibers, or at least eight optical fibers, or at least twelve optical fibers, or at least sixteen optical fibers, or at least twenty-four optical fibers, or at least thirty-two optical fibers, or at least thirty-six optical fibers, or more than thirty-six optical fibers.

Figure 3:
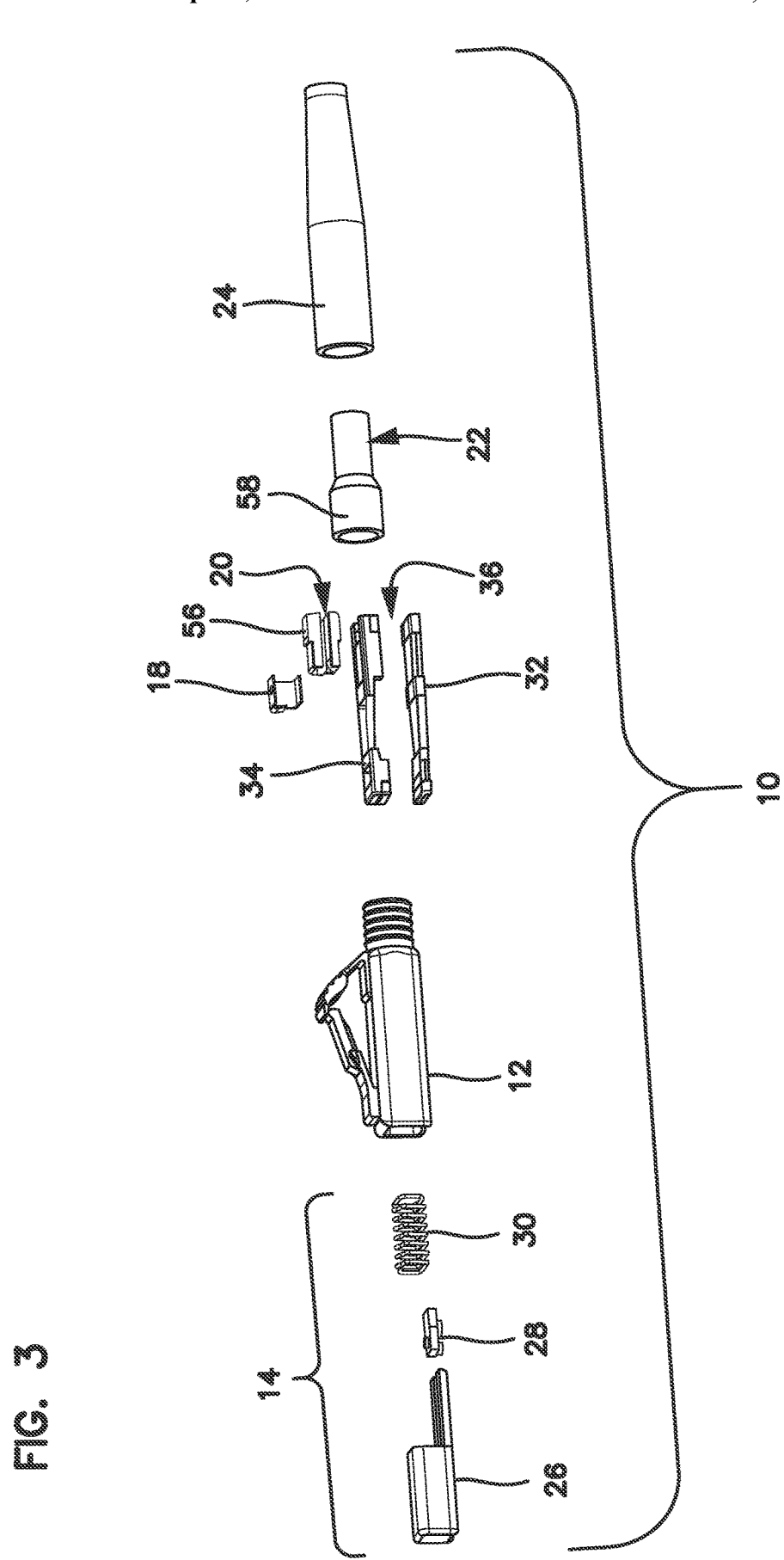
FIG. 3 is a further exploded view of the ferrule-less multi-fiber optical connector of FIG. 1 and the multi-fiber assembly of FIG. 2.
Figure 6:
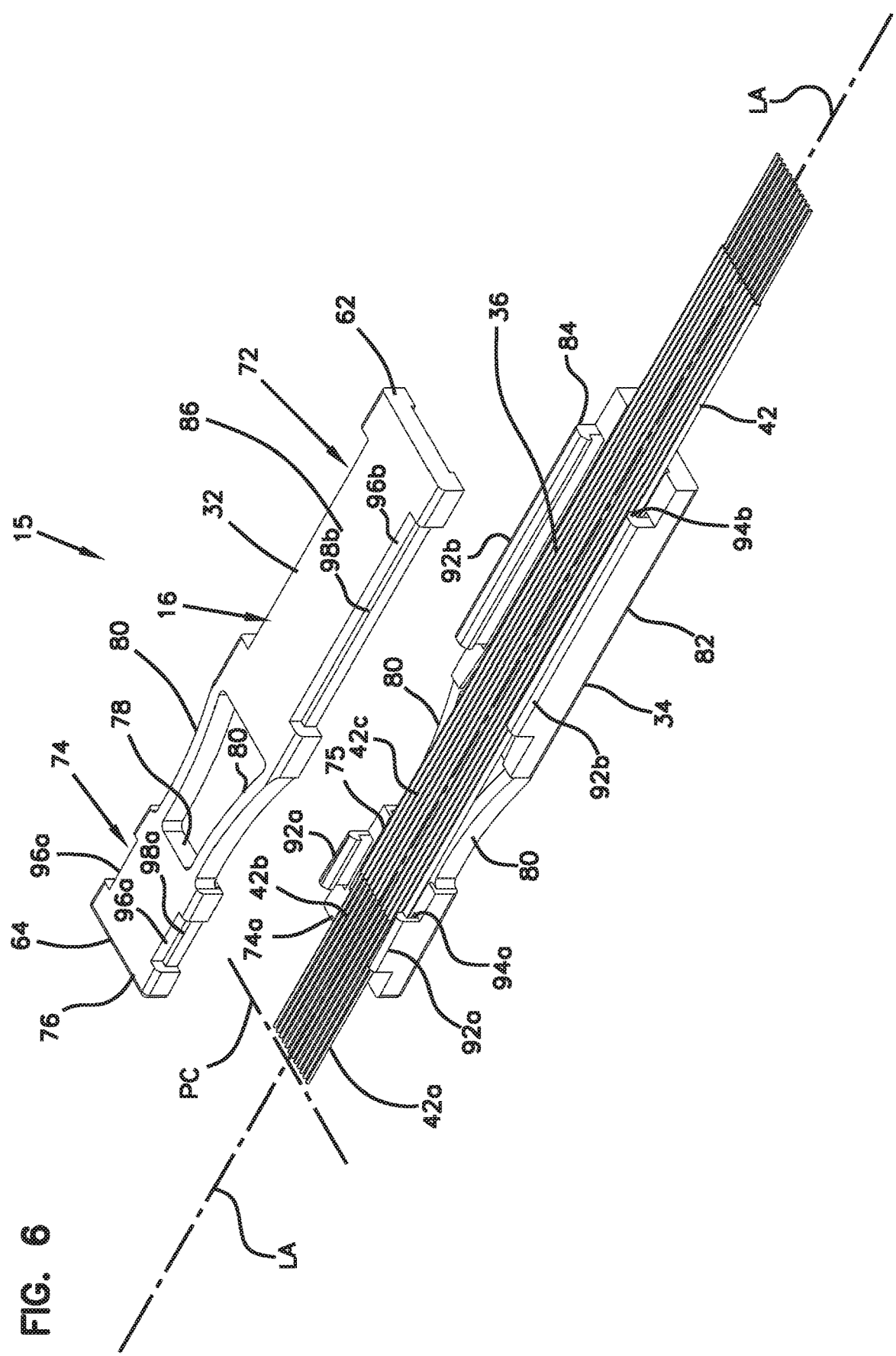
FIG. 6 is an exploded rear perspective view of the multi-fiber assembly of FIG. 5.

In certain examples, the multi-fiber alignment holder 16 can include a two-piece construction such as two halves (e.g., parts, pieces, members) that can be interconnected via a snap-fit connection or a press fit connection, although alternatives are possible. In certain examples, the two halves can be interconnected via an integral, flexible, living hinge, although alternatives are possible. As shown at FIGS. 3 and 6, the two halves of the multi-fiber alignment holder 16 can include a first holder piece 32 (e.g., a base, lower piece, groove-defining lower piece) and a second holder piece 34 (e.g., a cover, upper piece, groove-defining upper piece) that cooperate together to define an interior 36 (e.g., internal cavity) of the multi-fiber holder 16.

In certain examples, the first holder piece 32 forms a bottom 38 of the multi-fiber alignment holder 16 and the second holder piece 34 forms a top 40 of the multi-fiber alignment holder 16. It will be appreciated that the first holder piece 32 may form the top 40 of the multi-fiber alignment holder 16 and the second holder piece 34 may form the bottom 38 of the multi-fiber alignment holder 16. In certain examples, the first holder piece 32 and the second holder piece 34 may optionally be molded plastic components (e.g., injection molded plastic components). Alternatively, the first holder piece 32 and the second holder piece 34 may be composed of aluminum or other metal and formed by a casting process, for example. It should be understood that the first and second holder pieces 32, 34 may be composed of any material and made by any forming process known to those skilled in the art without departing from the scope of the present disclosure.

Figure 4:
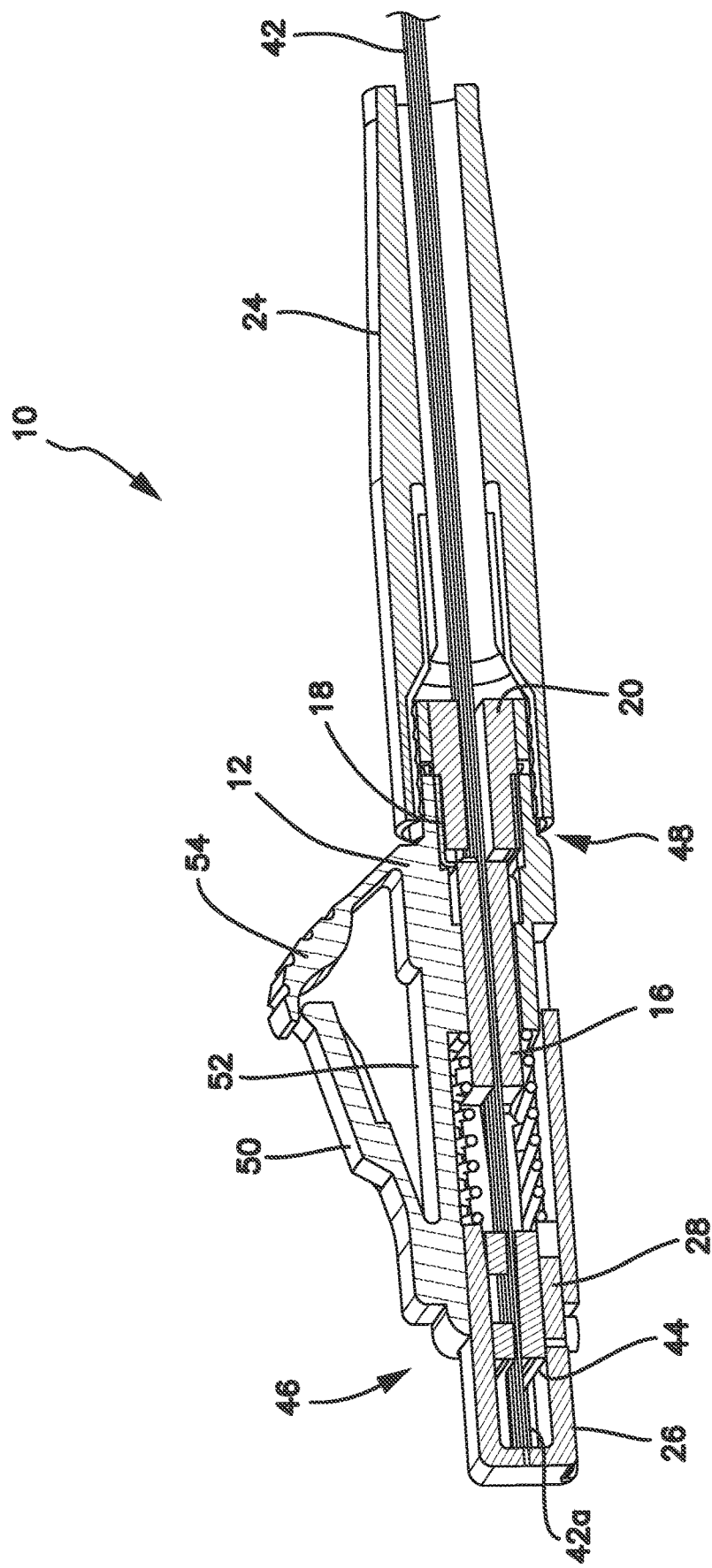
FIG. 4 is a cross-section view of the ferrule-less multi-fiber optical connector of FIG. 1.

In certain examples, the spring 18 biases the multi-fiber alignment holder 16 in a forward direction relative to the housing 12. In certain examples, a front end face 44 (see FIG. 5) of the multi-fiber alignment holder 16 is positioned at a front end 46 (see FIG. 4) of the housing 12, opposite a rear end 48 (see FIG. 4) of the housing 12. As shown at FIG. 4, the front end face 44 is covered by the shroud 26. The optical fibers 42 are shown including free end portions 42a (e.g., unsupported fiber end portions) that project forwardly beyond the front end face 44. The free end portions 42a are preferably bare optical fibers (e.g., the free end portions 42 are not coated and instead include only a core and cladding layer) and are non-ferrulized. The free end portions 42a preferably project at least 1 millimeter, or at least 2 millimeters, or at least 3 millimeters, or at least 4 millimeters beyond the front end face 44. When the multi-fiber optical connector 10 is not coupled to another connector, the shroud 26 is in an extended positioned and fully covers the free end portions 42a of the optical fibers. When the front end 46 of the multi-fiber optical connector 10 is inserted into a port of a fiber optic adapter, the shroud 26 axially retracts against the bias of spring 30 to expose the free end portions 42a (i.e., the free end portions 42a extend through the shroud 26 and project forwardly from the shroud 26 when the shroud 26 is retracted). With the shroud 26 retracted, the exposed free end portions 42a can readily be inserted into a bare fiber alignment structure (e.g., a structure including fiber alignment grooves such as V-grooves or other fiber receivers such as fiber alignment bores) to provide co-axial alignment between the optical fibers and corresponding optical fibers of another optical fiber loaded into an opposite port of the fiber optic adapter. The tips of the free end portions 42a can be treated within an energy source such as a plasma discharge or laser to round the tips to make the tips more durable.

The front end 46 of the housing 12 of the multi-fiber optical connector 10 forms a plug portion of the multi-fiber optical connector 10 that is configured to fit within a port of a corresponding fiber optic adapter. The housing 12 includes a latch 50 (see FIG. 4) for securing the housing 12 within the fiber optic adapter. As is known in the art, when the multi-fiber optical connector 10 is placed in a port of a fiber optic adapter, the latch 50 functions to lock the multi-fiber optical connector 10 in place within an adapter. The multi-fiber optical connector 10 may be removed from an adapter by depressing the latch trigger 54, which causes the latch 50 to be pressed in a downward direction, freeing the latch 50 from a fiber optic adapter.

The rear insert 20 is placed in contact with an end of the compression spring 18. The rear insert 20 acts as a strength member anchor (i.e., a structure to which strength members such as Aramid yarn or other reinforcing structure of a fiber optic cable can be secured) and holds the multi-fiber alignment holder 16 and the compression spring 18 in place within the housing 12. In certain examples, the rear insert 20 of the multi-fiber optic connector 10 is configured to be snap-fit to the housing 12. In certain examples, the rear insert 20 is configured to be press-fit into the housing 12.

The rear insert 20 defines a rear portion 56 against which a strength layer of the fiber optic cable to which the connector 10 is terminated can be secured by crimping. The strength layer can include strand, string or yarn type reinforcing elements (e.g. Aramid yarn) which are secured to the rear portion 56 by means such as the crimp band/sleeve 22 (or adhesive in other examples) which is radially crimped about the rear portion thereby radially compressing the strength elements between the crimp band/sleeve 22 and the rear portion 56. The strain relief sleeve 24 surrounds the rear portion 56 and the cable. The strain relief sleeve 24 is snap-fit or otherwise secured over the crimp sleeve 22. Optical fibers 42 pass through the crimp sleeve 22 and the rear insert 20 before being led to the interior 36 of the housing 12.

Figure 5:
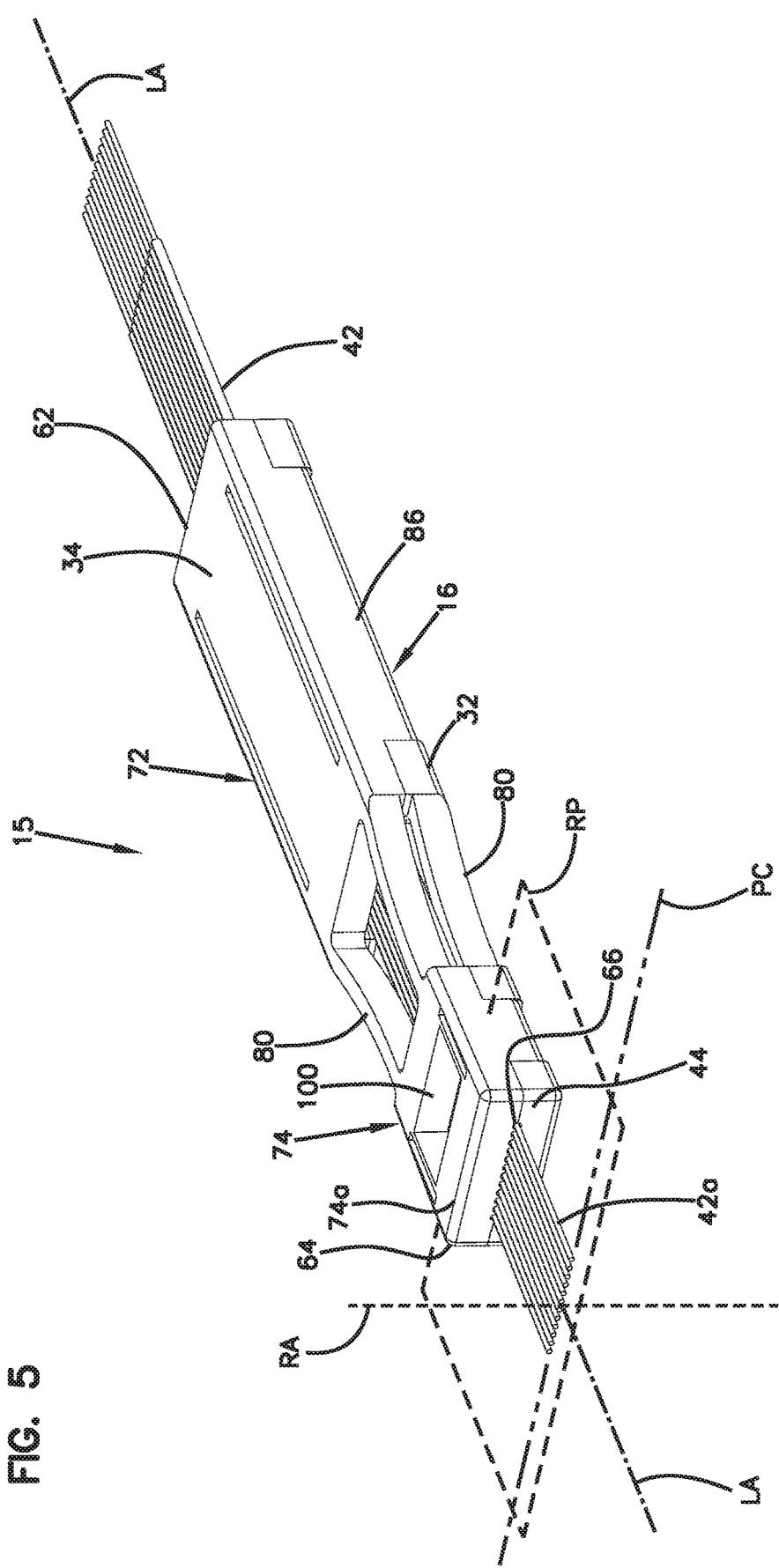
FIG. 5 is a front perspective view of the multi-fiber assembly of FIG. 2.

Turning to FIGS. 5-6, the multi-fiber holder 16 is configured to hold the optical fibers 42 therein. The multi-fiber holder 16 has a back (i.e., rear) end 62 and a front end 64 and defines a central longitudinal axis LA that extends lengthwise though the multi-fiber holder 16 from the rear end 62 to the front end 64. The multi-fiber alignment holder 16 includes a front head portion 74 (i.e., a head or head portion) which defines a plurality of discrete fiber openings 66 that extend in a direction along the longitudinal axis LA at least partially through the front head portion 74 and at least partially through an entire length of the multi-fiber holder 16. The fiber openings 66 can have v-shaped cross-sections, round cross-sections, or other shaped cross-sections, and each preferably receive one of the optical fibers 42. Preferably, portions 42b of the optical fibers 42 within the fiber openings 66 are uncoated (e.g., bare fiber portions). In one example, the openings 66 can include twelve parallel openings 66 having a center-to-center spacing of about 200 microns or about 250 microns. The portions 42b of the optical fibers 42 within the front head portion 74 can be axially fixed (e.g., bonded, mechanically fixed by clamping or other means, or otherwise secured) to prevent axial/longitudinal movement of the portions 42b relative to the head portion 74. In a preferred example, the portions 42b can be bonded within the multi-fiber holder 16 (e.g., at the head portion 74). In one example, the optical fibers 42 can be loaded into the multi-fiber holder 16 and secured within the fiber openings 66 with a bonding material such as epoxy or other adhesive. A side window can be used to apply the adhesive into the interior of the head portion 74 after the fibers have been loaded into the fiber holder 16 and the fiber holder 16 has been closed/assembled about the fibers 42.

In certain examples, the fiber alignment openings 66 are defined at a front portion 74a of the front head portion 74, and the remainder of the multi-fiber holder 16 (i.e., the portion of the fiber holder 16 positioned behind the front portion 74a) can define one enlarged main fiber channel 75 for receiving all the fibers 42. Portions 42c of the fibers 42 extending through the main fiber channel 75 can be coated optical fibers to provide the fibers with greater protection. In certain examples, bonding material applied through the window in the head portion 74 can contact both the bare fiber portions 42b and forward ends of the coated portions 42c. However, the majority of the lengths of the coated portions 42c are not bonded to the multi-fiber holder 16. In certain embodiments, the coating layer or layers can include a polymeric material such as acrylate having an outer diameter in the range of about 230-260 microns. In certain examples, the rear of the holder can be configured to receive a fiber ribbon having a height ranging from 320-360 microns and a width ranging from 3150-3500 microns. Other sizes can also be accommodated.

The fiber openings 66 are configured to align the free end portions 42a of the optical fibers 42 parallel to one another. Additionally, the optical fibers 42 are arranged in a row and the fibers of the row are aligned along a common reference plane RP (see FIG. 5) that extends along the longitudinal axis LA. The free end portions 42a include fiber tips that are aligned along a physical contact reference line PC included within the reference plane RP. When the fiber holder 16 is at a normal, centered state (e.g., an at-rest state), the physical contact reference line PC is perpendicular with respect to the longitudinal axis LA (see FIGS. 5 and 7). When the fiber holder 16 is mounted in the housing 12 of the connector 10, the longitudinal axis LA of the fiber holder 16 coincides with a longitudinal axis of the multi-fiber optical connector 10. When the fiber holder in a state of angular adjustment (e.g., either left or right as shown by FIGS. 8 and 9), the physical contact reference line PC is obliquely angled relative to the central longitudinal axis LA. It will be appreciated that the free end portions 42a may each have slightly different lengths and therefore may not be aligned exactly on a common line. Thus, the physical contact reference line PC represents the average positions of the fiber tips.

The first and second holder pieces 32, 34 of the multi-fiber holder 16 cooperate to define a housing 72. The housing 72 includes the head portion 74 positioned at the front end 64 of the holder and a main body portion 86 at the rear end 62 of the holder 16. The head portion 74 has a front end 76 and a rear end 78. The housing 72 includes flexible beams 80 located on respective first and second sides 82, 84 of the housing 72 (e.g., at least first and second ones of the beams are positioned on opposite sides of the longitudinal axis LA). The flexible beams 80 have a forward ends coupled to the rear end 78 of the head portion 74, and rearward ends coupled to the main body portion 86 of the housing 72. The flexible beams 80 can be disposed between the head portion 74 and the main body portion 86 of the housing 72. In certain examples, the flexible beams 80 can be integrated (i.e., monolithically formed) with the head portion 74 and the main body portion 86, although alternatives are possible. In certain examples, first and second ones of the flexible beams 80 converge toward each other and toward the central longitudinal axis LA as the flexible beams 80 extend in a forward direction from the main body portion 86.

As depicted in FIGS. 5 and 6, the housing 72 of the multi-fiber alignment holder 16 is configured as two opposing pieces, the first holder piece 32 and the second holder piece 34. The first and second holder pieces 32, 34 can each define grooves or slots on an interior thereof. When the first holder piece 32 and the second holder piece 34 are mounted together, the grooves of respective first and second holder pieces 32, 34 cooperate to define the fiber openings 66. In other examples, only one of the pieces 32, 34 may define grooves and the other piece can function as a cover for opposing opposite sides of the grooves.

The first and second holder pieces 32, 34 each include flexible beams 80 at respective first and second sides 82, 84 of the housing 72. That is, the housing 72 has a pair of flexible beams 80 at respective first and second sides 82, 84 thereof. The flexible beams 80 are generally parallel form a flexible coupling or bridge between the head portion 74 and the main body portion 86. The flexible beams 80 of the first and second holder pieces 32, 34 positioned on respective first and second sides 82, 84 work together to form a hinge arrangement 104 to allow for angular adjustment of the front head portion 74 relative to the main body portion 86. This type of angular adjustment results in angular adjustment of the physical contact reference line PC relative to the central longitudinal axis LA from the normal configuration of FIG. 7 to one of the angular adjusted configurations of FIG. 8 or 9.

Figure 10:
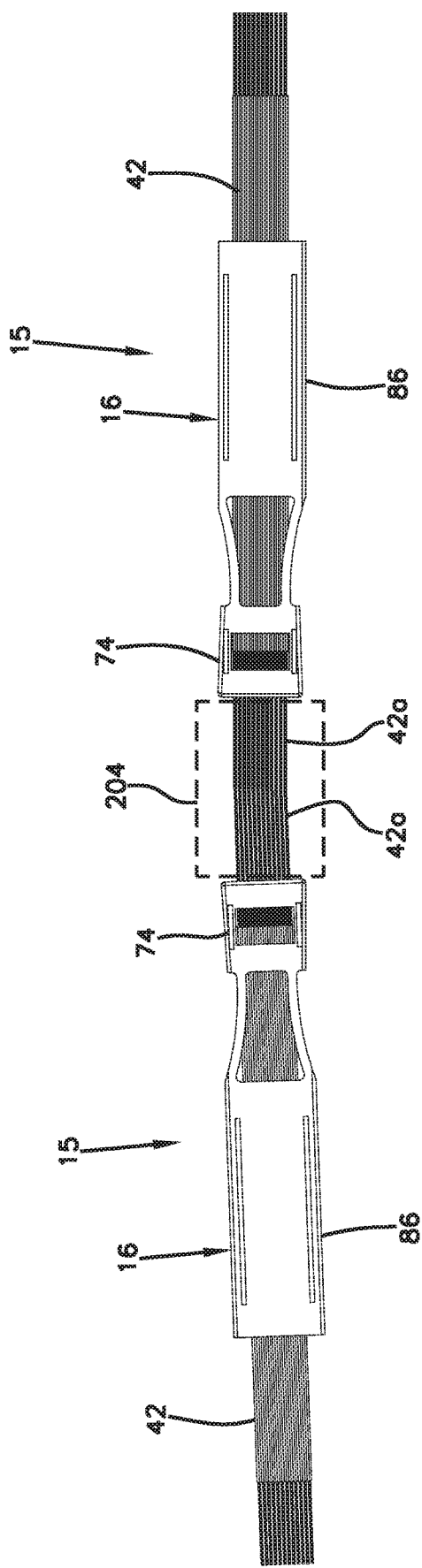
FIG. 10 is a top plan view of the multi-fiber assembly of FIG. 7 shown making physical contact with another multi-fiber assembly in a manner in which an angular misalignment gap is defined between opposing free ends of optical fibers of ferrule-less fiber optic connectors.
Figure 14:
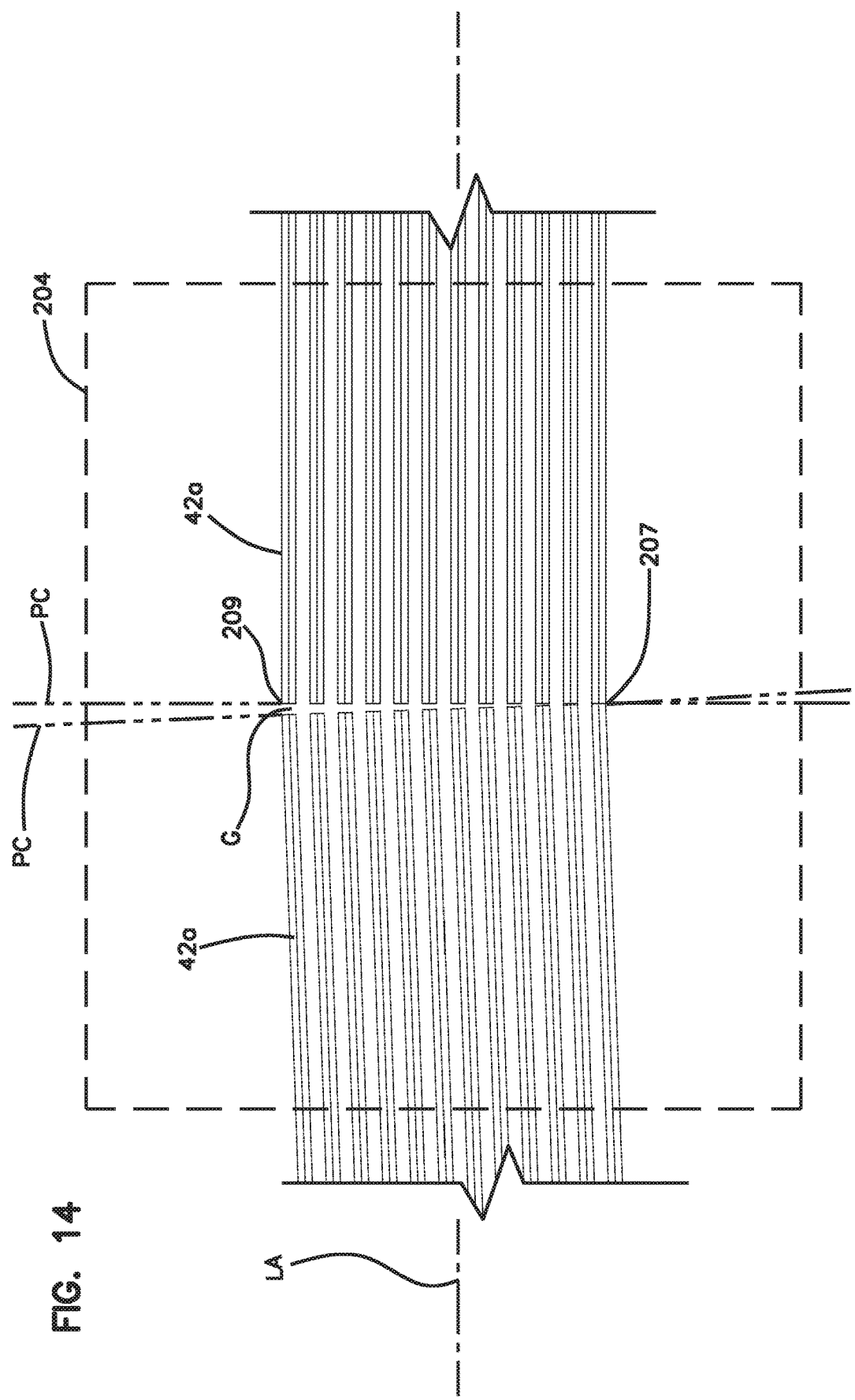
FIG. 14 is an enlarged view of a portion of FIG. 10 depicting the angular misalignment gap.

When a net axial load is applied to the free end portion 42a at a location offset from the central longitudinal axis LA (as would occur when physical contact is made between the sets of optical fibers of two fiber optic connectors when at least one of the connectors is misaligned as shown at FIGS. 10 and 14), the beams are caused to flex in a way in which the front head portion 74 moves about (e.g., rotates about, pivots about, orbits about, etc.) an adjustment reference axis RA that is positioned in front of the front head portion 74. In one example, the adjustment reference axis RA is located at the intersection between the central longitudinal axis LA and the physical contact line PC, and the adjustment reference axis RA is perpendicular to both the central longitudinal axis LA and the physical contact reference line PC. As the front head portion 74 angularly adjusts relative to the main body portion 86 via flexing of the beams 80, the front head portion 74 and the free end portions 42a of the optical fibers move relative to the main body portion 86 along the reference plane RP. It will be appreciated that during angular adjustment, the angular adjustment of the front head portion and the free end portion 42a occurs relative to the main body portion 86 and relative to the connector housing 12. Moreover, the angular adjustment causes angular adjustment of the physical contact reference line PC relative to the longitudinal axis LA (i.e., the physical contact reference line moves from the normal centered position of FIG. 7 to one of the angularly adjusted configurations of FIG. 8 or 9, depending upon the positioning of the net force on the fibers).

In the normal configuration of FIG. 7, angle A1 between the central longitudinal axis LA and the physical contact reference line PC equals 90 degrees. In the first angularly adjusted configuration of FIG. 8, angle A1 between the central longitudinal axis LA and the physical contact reference line PC is less than 90 degrees. In the second angularly adjusted configuration of FIG. 9, angle A1 between the central longitudinal axis LA and the physical contact reference line PC is greater than 90 degrees. Generally, the change in angle between the normal state and one of the angularly adjusted states is less than or equal to 5 degrees, or less than or equal to 2 degrees, or less than or equal to 1 degree, or less than or equal to ½ a degree.

In actual practice, the free end portions 42a will be constrained in a fiber alignment structure of a fiber optic adapter when physical contact is made with the optical fibers. Thus, the actual movement of the front head portion during angular may and likely will vary from the theoretical movement about the adjustment reference axis RA that would occur in free space, but will result in closing of any angular gaps between the aligned optical fibers.

In certain examples, the second holder piece 34 can include latch arms 92a positioned on opposite sides of the head portion 74 for securing the first and second holder pieces 32, 34 together. The latch arms 92a can include hook portions 94a to provide a connection between the first and second holder pieces 32, 34. The latch arms 92a may be integral with (e.g., formed in one seamless piece with) or coupled to, the second holder piece 34, although alternatives are possible. The head portion 74 of the first holder piece 32 can define a recess channel 96a on opposite sides thereof. The latch arms 92a can be adapted to mount in a respective one of the recess channel 96a such that the hook portions 94a snap over mounting structure 98a (e.g., rib, bar, flange, bracket, plate, tab, catches) within the recess channel 96a.

In certain examples, the second holder piece 34 can include latch arms 92b positioned on opposite sides of the main body portion 86 for securing the first and second holder pieces 32, 34 together. Similar to the latch arms 92a, the latch arms 92b can include hook portions 94b to provide a connection between the first and second holder pieces 32, 34. The latch arms 92b may be integral with (e.g., formed in one seamless piece with) or coupled to, the second holder piece 34, although alternatives are possible. The main body portion 86 of the first holder piece 32 can define a recess channel 96b on opposite sides thereof. The latch arms 92b can be adapted to mount in a respective one of the recess channel 96b such that the hook portions 94b snap over mounting structure 98b (e.g., rib, bar, flange, bracket, plate, tab, catches) within the recess channel 96b.

The second holder piece 34 defines a window 100 (e.g., opening) for receiving the bonding material. The bonding material can be injected using a suitable device such as a needle inserted into the window 100. The bonding material will surround the bare fiber portions 42b of the optical fibers 42 to lock the bare fiber portions 42b in place within the multi-fiber holder 16. The bonding material can also bond coated portions of the optical fibers within the holder.

Figure 11:
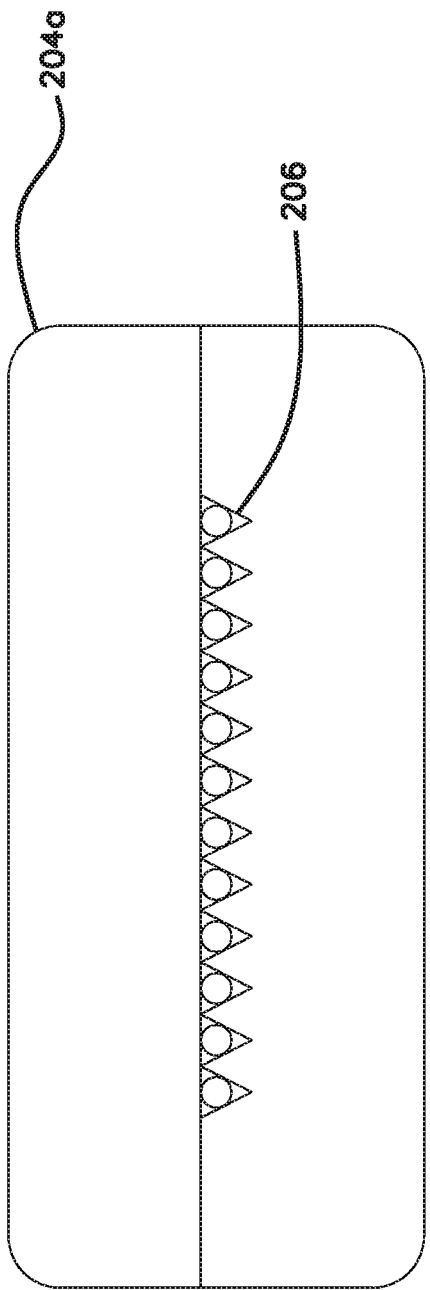
FIG. 11 shows an example configuration for an alignment device for co-axially aligning the optical fibers of the ferrule-less fiber optic connectors of FIG. 10.
Figure 12:
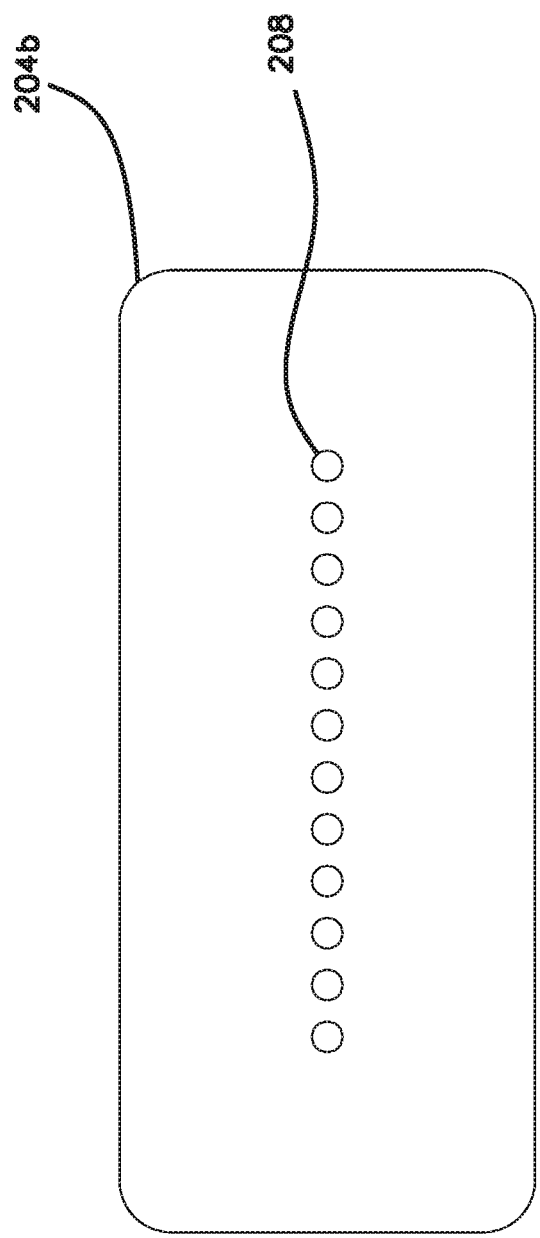
FIG. 12 shows another example configuration for an alignment device for co-axially aligning the optical fibers of the ferrule-less fiber optic connectors of FIG. 10.
Figure 13:
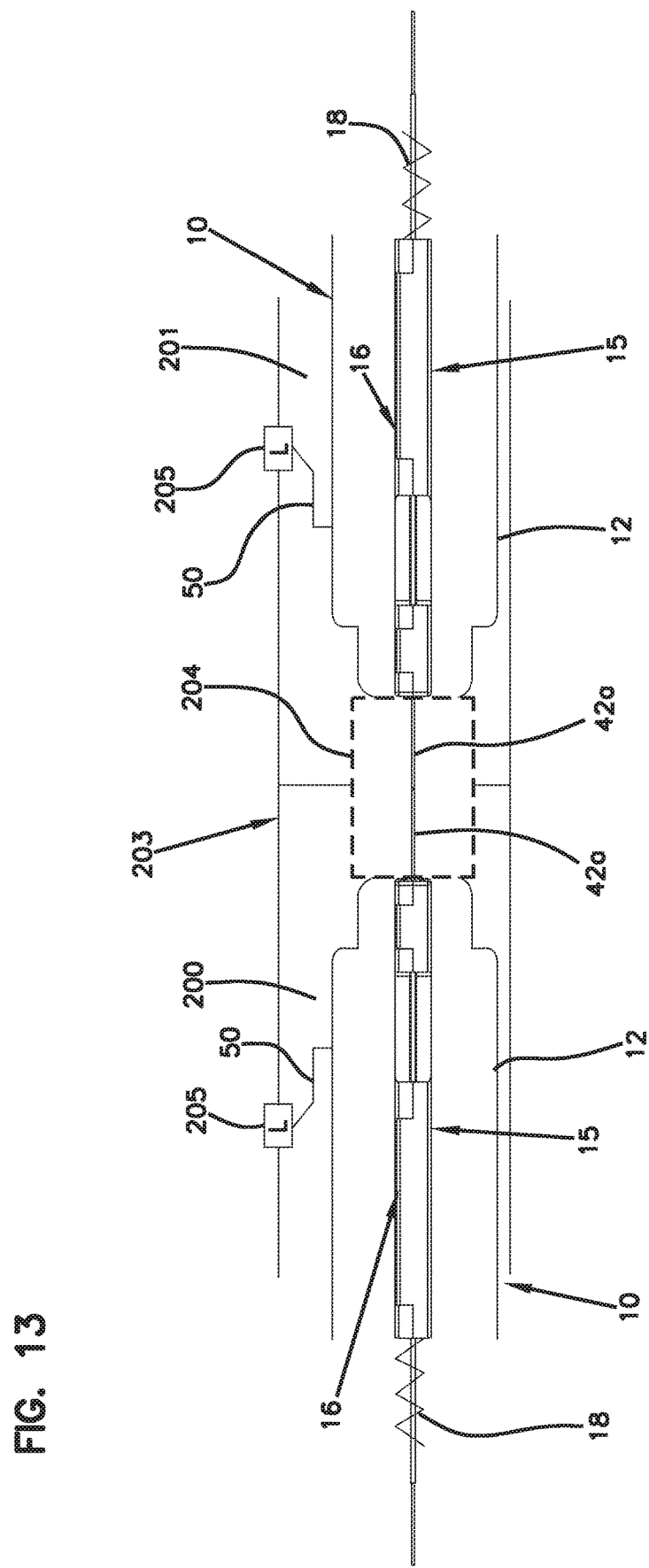
FIG. 13 is a side view of the multi-fiber assemblies of FIG. 10.

Turning to FIG. 13, schematic versions of the multi-fiber optical connector 10 are shown inserted within opposite ports 200, 201 of a fiber optic adapter 203 incorporating a bare fiber alignment system 204. Example configurations for the bare fiber alignment system 204 can include a bare fiber alignment system 204a having grooves such as v-grooves 206 (see FIG. 11) or a bare fiber alignment system 204b having rigid bores 208 (see FIG. 12). Examples of alternative suitable bare fiber alignment systems are also disclosed by PCT International Publication No. WO 2017/081306; PCT International Publication No. WO 2018/144128; PCT International Publication No. WO 2018/020022; PCT International Application No. PCT/US2018/056120; and U.S. Provisional Patent Application No. 62/724,356, all of which are hereby incorporated by reference in their entireties.

When the multi-fiber optical connectors 10 are inserted within the ports 200, 201 of the fiber optic adapter 203, the front shrouds 26 retract thereby exposing the free end portions 42a of the optical fibers 42 which are received within bare fiber alignment features (e.g., v-grooves 206 or bores 208) of the bare fiber alignment system 204. When fully inserted in the ports 200, 201, the latches 50 engage latching locations 205 within the adapter ports 200, 201 to secure the multi-fiber optical connectors 10 within the ports 200, 201. The latches 50 can engage the latching locations 205 to prevent axial withdrawal of the multi-fiber optical connectors 10 from the ports 200, 201. By depressing the latches 50, the multi-fiber optical connectors 10 can be withdrawn from the ports 200, 201. When the multi-fiber optical connectors 10 are inserted into the ports 200, 201, the tips of the free end portions 42a engage one another within the bare fiber alignment system 204. Physical contact between the tips of the free end portions 42a causes the connector housings 12 to move forwardly relative to the multi-fiber assemblies 15 during the connector insertion process causing the springs 18 to concurrently spring-bias the multi-fiber assemblies 15 toward one another such that the tips of the free end portions 42a are forced together by the spring force of the springs 18. When the multi-fiber optical connectors 10 are latched within the ports 200, 201, the multi-fiber optical connectors 10 are held at latched positions within the adapter ports 200, 201 in which the springs 18 maintain the spring loading on the fiber tips of the free end portions 42a. Thus, spring bias provided by the springs 18 ensures physical contact is maintained between the fiber tips of the free end portions 42a.

Figure 15:
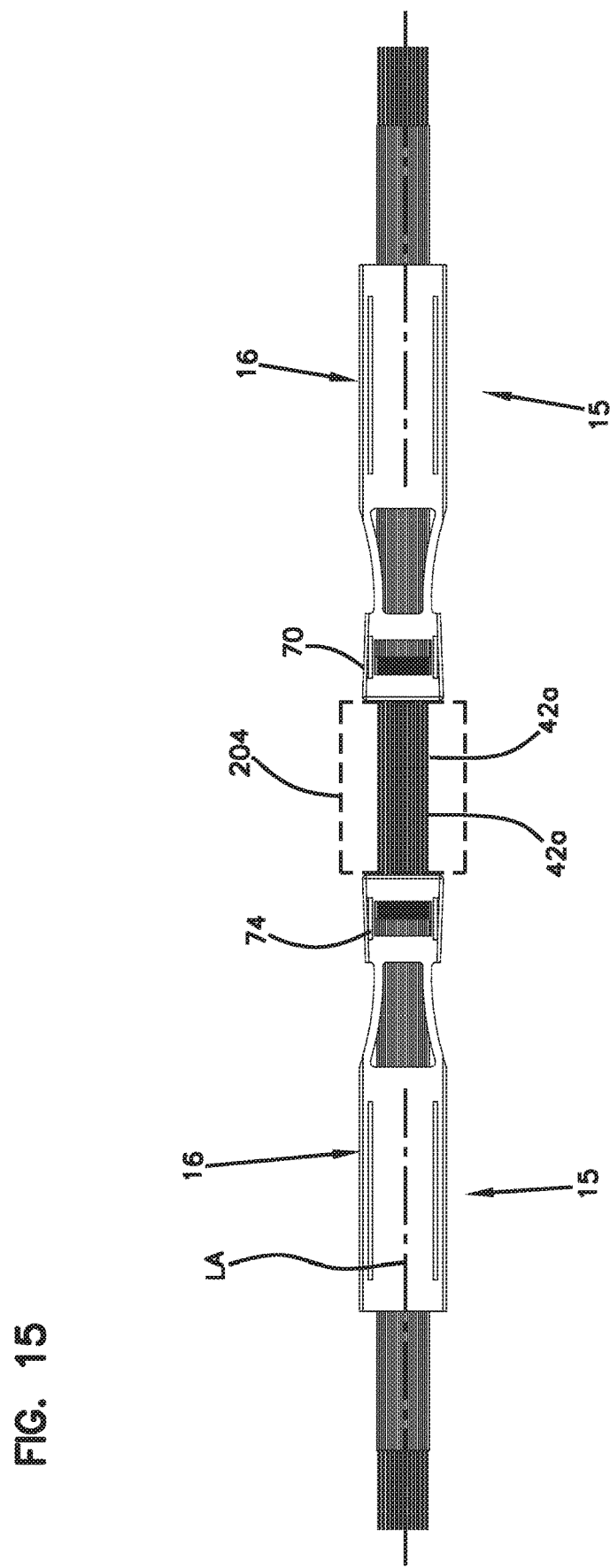
FIG. 15 is a top plan view of the multi-fiber assemblies of FIG. 10 in which at least one of the multi-fiber assemblies has angularly adjusted its corresponding optical fibers to compensate for and close the angular misalignment gap of FIG. 10.
Figure 16:
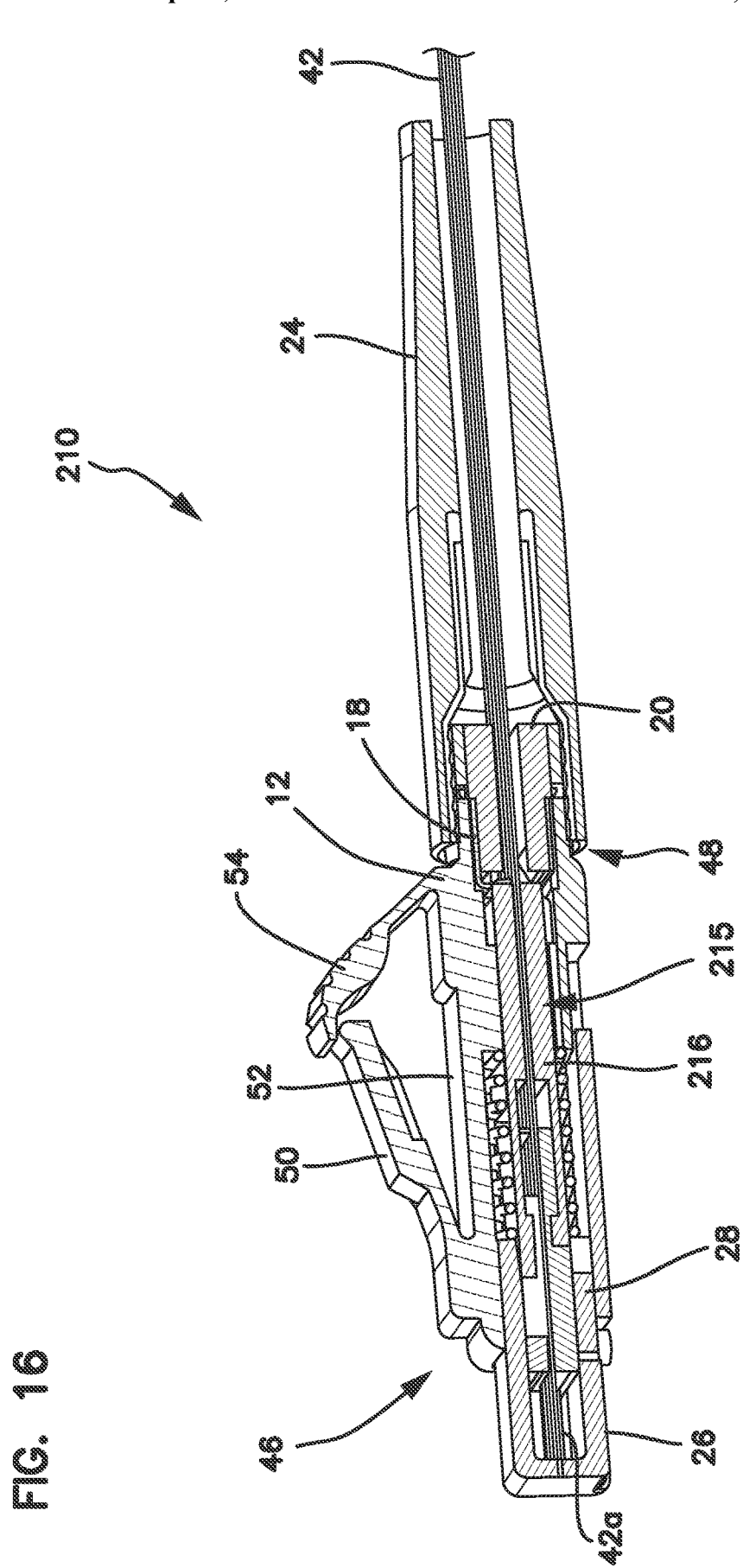
FIG. 16 is side perspective view of another ferrule-less multi-fiber optical connector in accordance with principles of the present disclosure.
Figure 17:
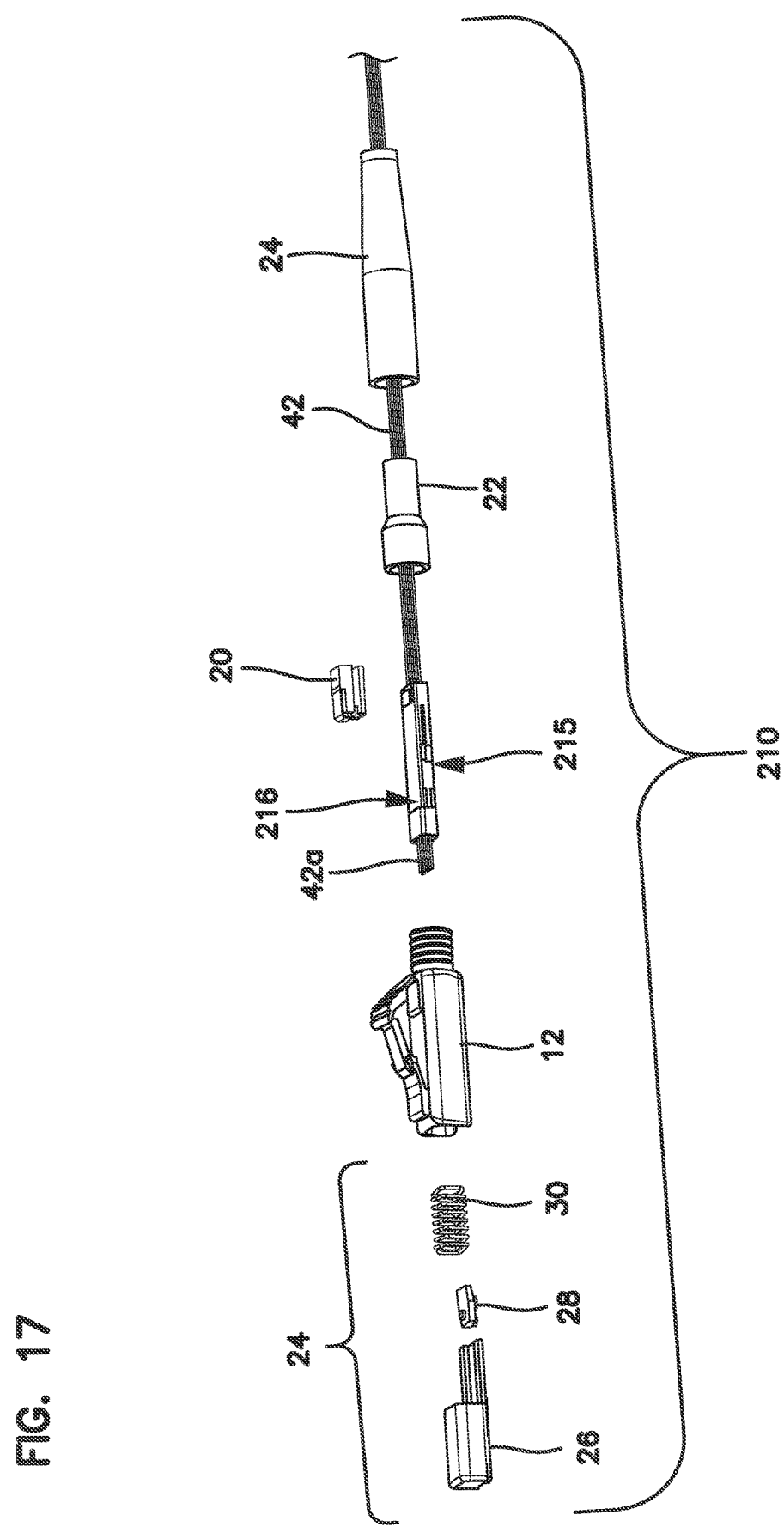
FIG. 17 is an exploded view of the ferrule-less multi-fiber optical connector of FIG. 16 showing another multi-fiber assembly in accordance with principles of the present disclosure.
Figure 18:
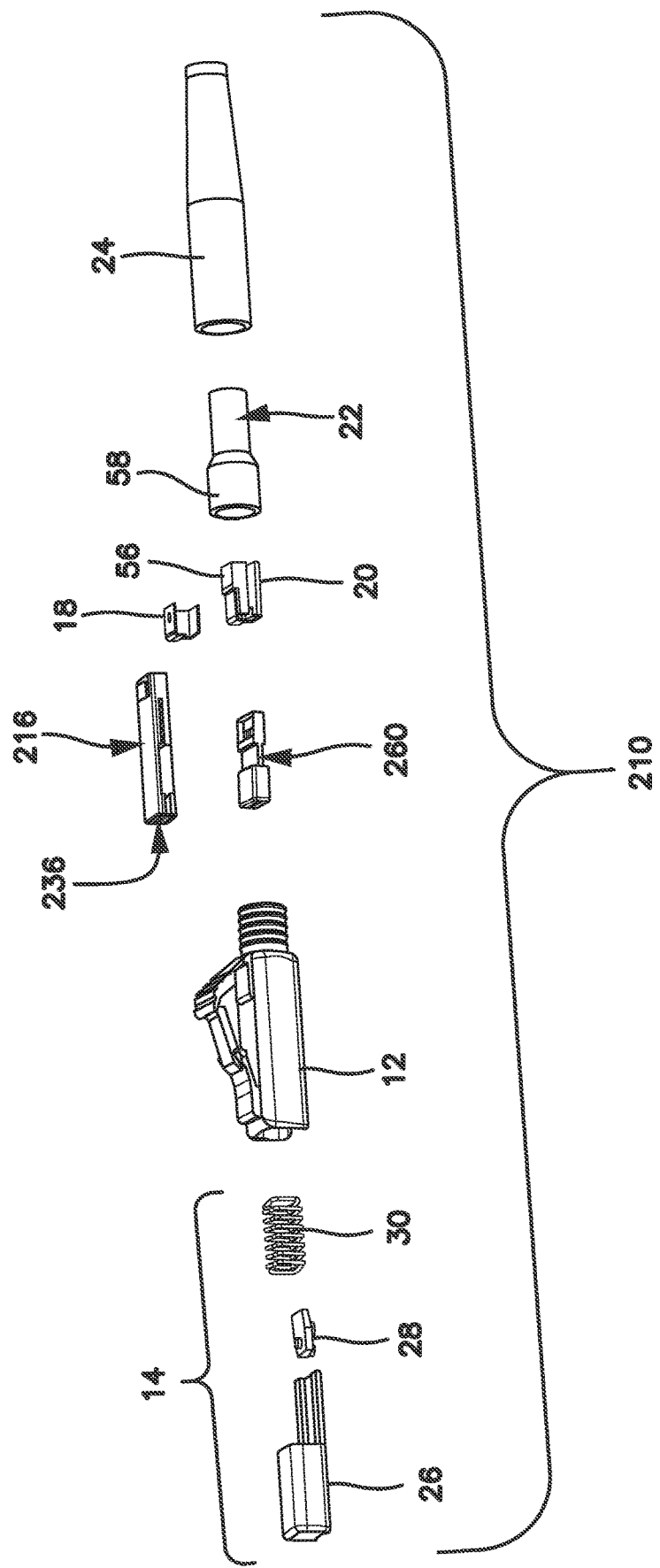
FIG. 18 is an exploded view of the ferrule-less multi-fiber optic connector of FIG. 16 and the multi-fiber assembly of FIG. 17.

During the connector insertion process, one of the multi-fiber optical connectors 10 may be misaligned within its corresponding port 200, 201 causing the physical contact reference lines PC of the connectors 10 to be angularly misaligned (i.e., the physical contact reference lines PC are skewed or oriented at a non-parallel angle relative to each other as shown at FIGS. 10 and 14). This type of misalignment causes the optical fiber tips at one end 207 (e.g., the bottom end as shown at FIGS. 10 and 14) of the rows of free end portions 42a to contact one another while a gap G concurrently exists between the optical fiber tips at the opposite end 209 of the rows of free end portions 42a (e.g., the top end as shown at FIGS. 10 and 14). Contact between the fiber tips at the end 207 of the fiber rows generates an unbalanced force that is offset from the central longitudinal axis LA. The unbalanced force is transferred to the multi-fiber assemblies 15 by the springs 18 during the insertion process and is sufficiently large to cause the beams 80 of the misaligned connector to flex (e.g., deform) during the connector insertion process. Flexing of the beams 80 causes the front head portion 74 of the multi-fiber holder 16 and the free end portions 42a of the optical fibers 42 to angularly adjust along the reference plane RP relative to the connector housing 12 and the main body of the multi-fiber holder 16 until the gap G is closed and the physical contact reference lines PC are aligned such that all the fiber tips contact one another (see FIG. 15). With the multi-fiber optical connectors 10 latched within the ports 200, 201, the springs 18 continue to apply enough spring load to the fiber tips to maintain the beams 80 of the misaligned connector in the flexed state in which the physical contact reference lines PC are aligned. It will be appreciated that both the connectors 10 may concurrently adjust to compensate for the misalignment.

In certain examples, the physical contact reference lines PC adjust a few degrees or less to improve mating contact of the fiber tips of the optical fibers 42. In certain examples, the hinge arrangement 104 is arranged and configured such that the head portion 74 of the multi-fiber alignment holder 16 can pivot to adjust an angle of the physical contact reference line PC at least ¼ degree to adjust for an angular misalignment gap G of at least 12 microns, although alternatives are possible. In certain examples, the hinge arrangement 104 can be adapted to allow the head portion 74 of the multi-fiber alignment holder 16 to pivot to adjust and angle of the physical contact reference line PC at least ½ degree to adjust for an angular misalignment gap G of at least 23 microns, although alternatives are possible. In certain examples, the hinge arrangement 104 can be arranged and configured to allow the head portion 74 of the multi-fiber alignment holder 16 to pivot to adjust an angle of the physical contact reference line PC at least 1 degree to adjust for an angular misalignment gap G of at least 48 microns, although alternatives are possible. It will be appreciated that the angle of the physical contact reference line can be measured with respect to the central longitudinal axis.

FIGS. 16-30 illustrate another example multi-fiber optical connector 210 in accordance with the principles of the present disclosure. The multi-fiber optical connector 210 has the same basic structure as the multi-fiber optical connector 10, except the multi-fiber optical connector 210 has a modified multi-fiber assembly 215 in accordance with the principles of the present disclosure. Common parts shared between the two connectors 10, 210 have been labeled with the same reference numbers.

Figure 19:
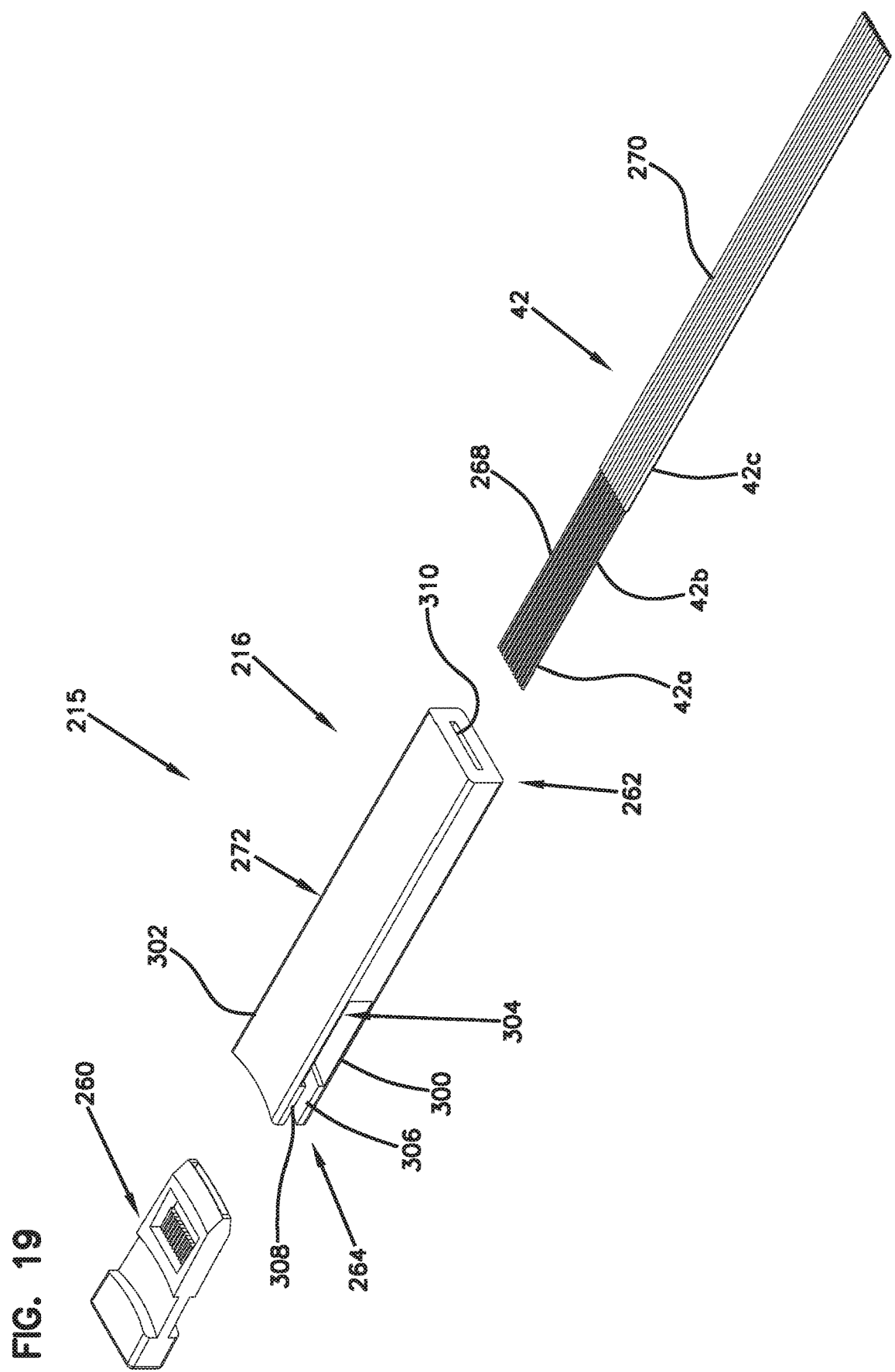
FIG. 19 is an exploded rear perspective view of the multi-fiber assembly of FIG. 17.
Figure 20:
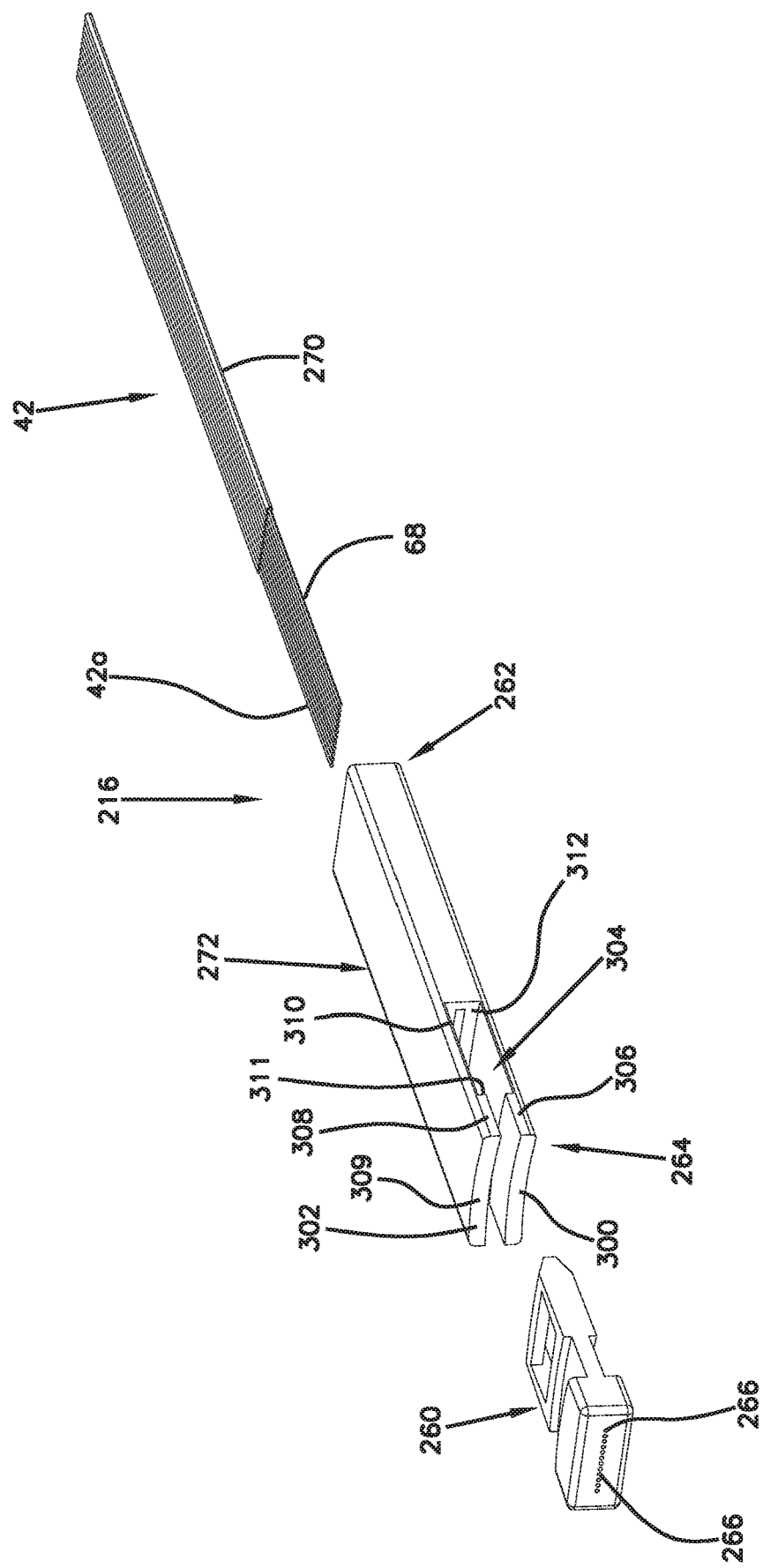
FIG. 20 is an exploded front perspective view of the multi-fiber assembly of FIG. 19.
Figure 21:
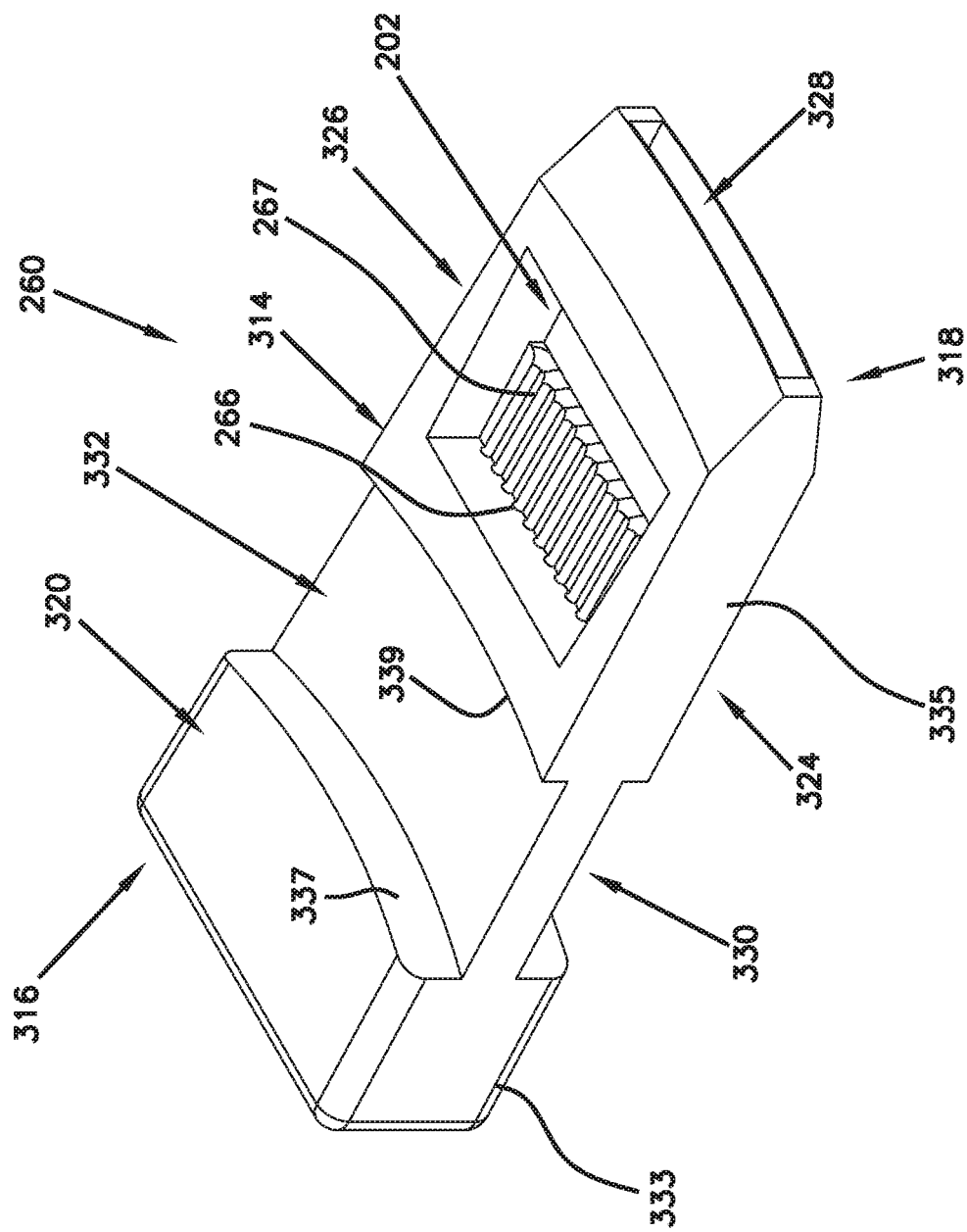
FIG. 21 is a rear, perspective view a front head of a fiber holder of the multi-fiber assembly of FIG. 19.
Figure 22:
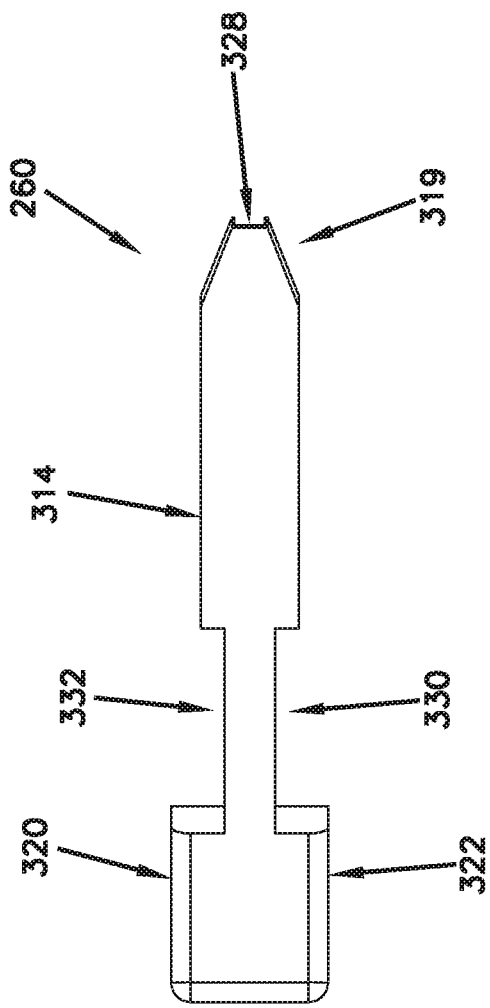
FIG. 22 is a side view the front head of FIG. 21.
Figure 23:
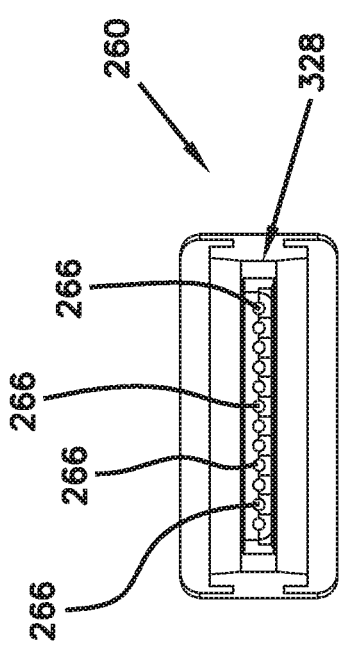
FIG. 23 is a front view of the front head of FIG. 21.
Figure 26:
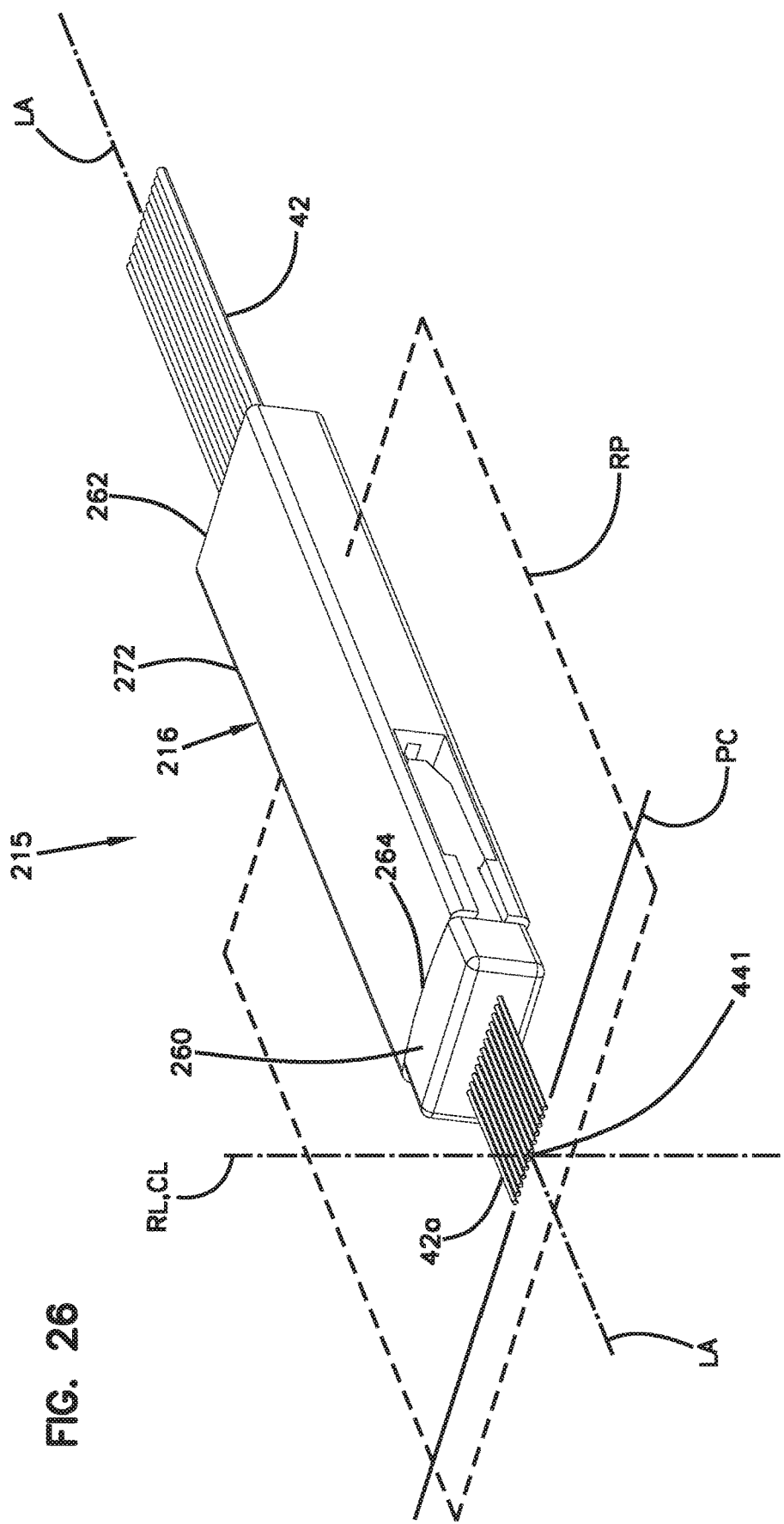
FIG. 26 is a front, assembled perspective view of the multi-fiber assembly of FIG. 19.

Turning to FIGS. 19, 20 and 26, the multi-fiber assembly 215 includes a multi-fiber holder 216 for holding the optical fibers 42. The multi-fiber holder 216 mounts within the connector housing 12 and optical fibers 42 have free end portions 42a that project forwardly from the multi-fiber holder 216 and align along a reference plane RP (see FIG. 26). The multi-fiber holder 216 extends lengthwise along a longitudinal axis of the connector 210 when mounted within the connector housing 12. Tips of the free end portions 42a align along a physical contact reference line PC. The multi-fiber holder 216 includes a first portion (e.g., a base portion 272) that mounts within the connector housing 12 in a manner that permits relative axial/longitudinal movement between the first portion and the connector housing 12, but prevents or restricts relative angular movement between the first portion and the connector housing 12. The optical fibers 42 extend longitudinally through the first portion. The multi-fiber holder 216 also includes a second portion (e.g., a head portion 260) coupled to the first portion. In certain examples, the optical fibers 42 are axially fixed (e.g., bonded) relative to second portion. In certain examples, the second portion is coupled to the first portion in a manner that allows for relative axial movement between the connector housing 12 and both the first and second portions when the multi-fiber holder 216 is mounted within the connector housing 12. In certain examples, the second portion is mechanically coupled to the first portion in a manner that allows the second portion to angularly adjust (e.g., pivot) relative to the first portion.

In certain examples, a spring 18 biases the multi-fiber holder 216 in a forward direction relative to the connector housing 12. In certain examples, when the multi-fiber optical connector 210 is inserted into a port of a fiber optic adapter (e.g., the fiber optic adapter 203), the shroud 26 retracts exposing the free end portions 42a such that the free end portions 42a can be received within a bare-fiber alignment structure of the fiber optic adapter. In certain examples, when the multi-fiber holder 216 is mounted within the connector housing 12, the second portion of the holder 216 can angularly adjust along the reference plane RP relative to both the first portion of the holder 216 and the connector housing 12 to compensate for and correct an angular misalignment that may occur when making an optical connection with another multi-fiber optical connector via the fiber optic adapter. Spring force from the spring 18 can hold the second portion of the multi-fiber holder 216 in the angularly adjusted position when the multi-fiber optical connector 210 is secured (e.g., latched) in the port of the fiber optic adapter.

The multi-fiber holder 216 includes the front head portion 260 and the base portion 272 (depicted an elongate sleeve). The base portion 272 has a back end 262 and a front end 264. The front head portion 260 mounts at the front end 264 of the base portion 272. The front head portion 260 and the base portion 272 are coupled together by a pivotal interface including a first pivot guide structure (e.g., a curved member such as a curved rail or wall) that slidably engages and optionally mates with a second pivot guide structure (e.g., a curved receptacle such as a curved slot). In certain examples, the pivot guide structures can include curved surfaces that curve about a point positioned in front of the front head portion 260. In certain examples, each curved surface can extend along an arc of a circle and can be defined by a radius originating from a center point of the circle which is positioned in front of the front head portion 260. In one example, the center point is located at an intersection between the longitudinal axis LA of the multi-fiber connector 210 and the physical contact reference line PC defined by the tips of the optical fibers 42. In one example, the first pivot guide structure is a male feature integrated with the base portion 272 and the second pivot guide structure is a female feature integrated with the front head portion 260. In other examples, the pivot guide structures can be reversed so that the male feature is integrated with the front head portion and the female feature is integrated with the base portion.

Turning to FIGS. 19-25, the front head portion 260 has a main body 314 having a front end 316, a back end 318, a top 320, a bottom 322, two sides 324, 326, and a fiber passage structure 328 extending from the back end 318 to the front end 316. The fiber passage structure 328 is configured to receive the optical fibers 42. The bottom side 322 and the tops side 324 can respectively define pivot guide slots 330, 332 that extend across the width of the main body 314 between the sides 324, 326. The pivot guide slots 330, 332 divide the main body 314 into a front region 333 and a back region 335. The pivot guide slots 330, 332 include each curved guide surfaces 337, 339 between which the slots 330, 332 are defined. In one example, the curved guide surfaces 337, 339 extend along arcs of a circle and are refined by radii R1, R2 that originate at a center point 441 of the circle. In one example, the center point 441 is positioned in front of the front end 316 of the front head portion 260. When the front head portion 260 is mounted with the base potion 272 with the optical fibers 42 secured to the front head portion 260 (see FIG. 27), the center point 441 is located at the intersection between the longitudinal axis LA and the physical contact reference line PC.

The front region 333 can define a plurality of discrete fiber receptacles such as bores 266 which form a front portion of the fiber passage structure 328. The bores 266 extend in a rear-to-front orientation through the front region 333 and are configured to each receive a respective one of the plurality of optical fibers 42. In one example, bores 266 can include twelve parallel alignment bores having a center-to-center spacing of about 250 microns. In certain examples, the back region 335 can include fiber guides such as grooves 267 (e.g., v-grooves) for facilitating inserting the optical fibers 42 into the bores 266 from the rear of the head portion 260. The optical fibers 42 are routed through the fiber passage structure 328 and can include bare fiber portions 42b axially fixed (e.g., bonded) with respect to the front head portion 260 (e.g., by adhesive such as epoxy injected to the fiber passage 328 through a window 202 defined through the back region 335 of the head portion 260. Preferably, the bare fiber portions 42b are provided within the bores 260 and the grooves 267, and coated fiber portions 42c extend rearwardly from the bare fiber portions 42b. Adhesive may be applied to portions of the bare fiber portions 42b as well as portions of the coated portions 42c. At the back end 318, the fiber passage structure can defined a single opening 310 having an elongate transverse cross-sectional shape. The fibers 42 are routed into the front head portion through the single opening 310 and are directed from the single opening 310 to the grooves 267.

The front end 264 of the base portion 272 includes first and second opposing retaining members 300, 302 (e.g., latch arms) that extend generally parallel to each other. The first and second retaining members 300, 302 may be flexible, spring-like cantilever arms that can flex to allow the front head portion 260 to be snapped into the front end of the base portion 272. The first and second flange members 300, 302 cooperate to define a receptacle 304 (e.g., recess, slot) for receiving the back region 335 of the front head portion 260 via a snap-fit connection. The first and second retaining members 300, 302 include curved guide rails 306, 308 configured to fit within the pivot guide slots 330, 332 of the front head portion 260. The curved guide rails 306, 308 each include curved guide surfaces 309, 311 that match the curvatures of the curved guide surface 337, 339. The curved guide surfaces 309, 311 oppose the curved guide surfaces 337, 339 when the front head portion 260 is coupled to the front end of the base portion 272. When the front head portion 260 angularly adjusts relative to the base portion 272 between a centered positon (see FIG. 27) and a first or second canted position (see FIGS. 28 and 29), the curved guide surfaces 337, 339 slide relative to the curved guide surface 309, 311 and move about the center point 441.

The front head portion 260 is normally in the centered position relative to the base portion 272 such that the longitudinal axis LA is perpendicular relative to the physical contact reference line PC (see FIG. 27). To account or adjust for angular mismatches that may occur during the optical connection process, the front head portion 260 can pivot relative to the base portion 272 in a first direction to the first angularly adjusted position (e.g., a first canted position as shown at FIG. 28) and can also pivot relative to the base portion 272 in a second direction to the second angularly adjusted position (e.g., a second canted position as shown at FIG. 29). In the first angularly adjusted position of FIG. 28, angle A1 between the central longitudinal axis LA and the physical contact reference line PC is less than 90 degrees. In the second angularly adjusted position of FIG. 29, angle A1 between the central longitudinal axis LA and the physical contact reference line PC is greater than 90 degrees. Generally, the change in angle between the normal state and one of the angularly adjusted states is less than or equal to 5 degrees, or less than or equal to 2 degrees, or less than or equal to 1 degree, or less than or equal to ½ a degree.

The two sides 324, 326 of the main body 314 of the front head portion 260 taper entirely along a length L of the main body 314 from the front end 316 to the back end 318. In certain examples, the two sides 324, 326 tapers inwardly toward the central longitudinal axis LA as the sides 324, 326 extend from the front end 316 to the back end 318. In certain examples, the amount of taper on the two sides 324, 326 of the front head portion 260 can vary, which can determine the range of pivotal movement within the opening 304.

Figure 30:
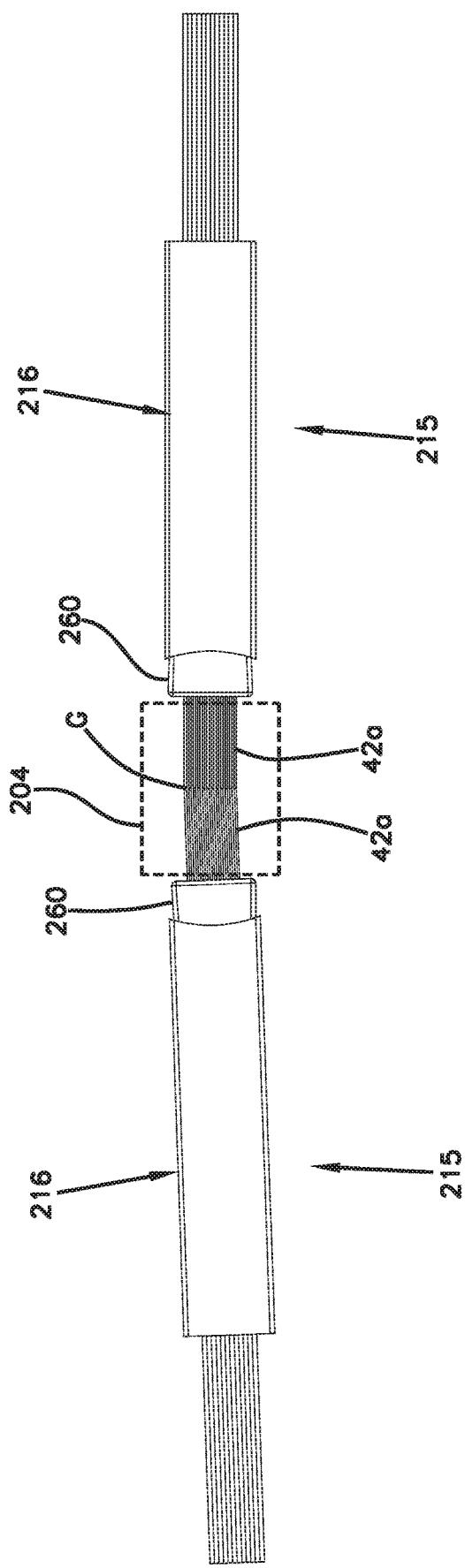
FIG. 30 is a top plan view of the multi-fiber assembly of FIG. 26 shown making physical contact with another multi-fiber assembly in a manner in which an angular misalignment gap is defined between opposing free ends of optical fibers of ferrule-less fiber optic connectors.

It will be appreciated that two of the multi-fiber optical connectors 210 can be optically connected together by a fiber optic adapter 203 in the same way described with respect to the fiber optic connectors 10. During insertion of the connectors 210 into to the ports of the adapter 203, one of the multi-fiber optical connectors 210 may be misaligned within its corresponding adapter port causing the physical contact reference lines PC of the connectors 210 to be angularly misaligned (i.e., the physical contact reference lines PC are skewed or oriented at a non-parallel angle relative to each other as shown at FIG. 30). This type of misalignment causes the optical fiber tips at one end (e.g., the bottom end as shown at FIG. 30) of the rows of free end portions 42a to contact one another while a gap G concurrently exists between the optical fiber tips at the opposite end of the rows of free end portions 42a (e.g., the top end as shown at FIG. 30). Contact between the fiber tips at one end of the fiber rows generates an unbalanced force that is offset from the central longitudinal axis LA. The unbalanced force is transferred to the multi-fiber assemblies 215 by the springs 18 during the insertion process and is sufficiently large to cause the front head portion 260 of the misaligned connector to angularly adjust via rotation about the center point during the connector insertion process. Such angular adjustment causes the free end portions 42a of the optical fibers 42 to angularly adjust along the reference plane RP relative to the connector housing 12 and the base portion 272 of the multi-fiber holder 216 until the gap G is closed and the physical contact reference lines PC are aligned such that all the fiber tips contact one another (see FIG. 31). With the multi-fiber optical connectors 210 latched within the adapter ports, the springs 18 continue to apply enough spring load to the fiber tips to maintain the front head portion 260 of the misaligned connector in the angularly adjusted state suitable for closing the gap G. It will be appreciated that both the connectors 210 may experience some level of adjustment to compensate for the misalignment.

In certain examples, optical fibers each include a core, a cladding layer surrounding the core, one or more coating layers surrounding the cladding layer, and a buffer layer surrounding the one or more coating layers. In certain examples, the core can have an outer diameter in the range of 8-12 microns (e.g., for single mode optical fibers), the cladding can have an outer diameter in the range of 120-130 microns, the one or more coatings can have an outer diameter in the range of 200-320 microns, and the outer buffer layer can have an outer diameter in the range of 800-1,100 microns. In certain examples, the outer buffer layer can be a loose or tight buffer tube having an outer diameter of about 900 microns. In certain examples, only the core and the cladding of the optical fibers are supported within the alignment structure. For optical fibers such as multi-mode optical fibers, the core can be significantly larger. Of course, fibers having dimensions other than those identified above can be used as well.

It will also be appreciated that the core and the cladding can be constructed of a material suitable for conveying an optical signal such a glass (e.g., a silica-based material). The cladding layer can have an index of refraction that is less than the index of refraction of the core. This difference between the index of refraction of the cladding layer and the index of refraction of the core allows an optical signal that is transmitted through the optical fiber to be confined to the core. The one or more coating layers typically have a polymeric construction such as acrylate.

As used herein, a bare fiber is a section of optical fiber that does not include any coating. Instead, the bare fiber includes a core surrounded by a cladding layer. The optical fiber is "bare" because the cladding layer is exposed and not covered by a supplemental protective coating layer such as acrylate.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure. Aspects of the present disclosure are applicable to fiber optic connectors having 2, 4, 8, 12, 16, 24, 32 or more optical fibers. For higher count fiber optical connectors, more than two rows of optical fibers may be provided. While the examples depicted herein show holders with pieces snapped together, in other examples the pieces can be adhesively bonded, welded (e.g., ultrasonically welded) or otherwise secured together.

Example Aspects of the Present Disclosure

Aspect 1: Aspect 1 relates to a fiber optic connector including an optical fiber holder having a holder end portion and a plurality of first optical fibers having unsupported fiber end portions (i.e., fiber end portions that are not supported by a ferrule of the fiber optic connector) that project outwardly from the holder end portion, wherein the holder end portion can move (e.g., pivot, rotate, swing, angularly adjust, etc.) to enhance physical contact between fiber end portions of the first optical fibers and second optical fibers of another optical component to provide optical connections there-between.

Aspect 2: Aspect 2 includes Aspect 1 and further includes the fiber optic connector including a connector body in which the optical fiber holder is mounted, the connector body defining a central longitudinal axis that extends along a length of the connector body, the fiber end portions of the first optical fibers having fiber tips arranged in a row, wherein the fiber tips define a physical contact reference line that extends along the row of fiber tips, and wherein the end portion of the optical fiber holder is moveable relative to the connector body to modify an angle between the physical contact reference line and the central longitudinal axis of the connector body to enhance the physical contact between the first optical fibers and the second optical fibers.

Aspect 3: Aspect 3 includes any of Aspects 1-2, and wherein unsupported fiber end portions of the first optical fibers are configured as bare optical fibers.

Aspect 4: Aspect 4 incudes any of Aspects 1-3, and wherein the unsupported fiber end portions are configured to be removeably received within a fiber alignment structure for co-axially aligning the unsupported fiber end portions with the plurality of second optical fibers.

Aspect 5: Aspect 5 includes any of Aspects 1-4, and wherein the unsupported fiber end portions project at least 1 millimeter beyond the holder end portion, or at least 2 millimeters beyond the holder end portion, or at least 3 millimeters beyond the holder end portion, or at least 4 millimeters beyond the holder end portion.

Aspect 6: Aspect 6 includes any of Aspects 1-5, and wherein the plurality of first optical fibers are axially fixed relative to the holder end portion (e.g., by adhesive, clamping, crimping, or other means) so that the first optical fibers are not axially moveable relative to the holder end portion.

Aspect 7: Aspect 7 includes any of Aspects 1-6, and wherein the fiber optic connector is configured such that the first optical fibers do not buckle within the fiber optic connector when the first optical fibers make physical contact with the second optical fibers.

Aspect 8: Aspect 8 includes any of Aspects 1-7, and wherein the fiber optic connector includes a front end, wherein the holder end portion of the optical fiber holder is positioned at the front end, and wherein unsupported fiber end portions project forwardly from the holder end portion.

Aspect 9: Aspect 9 includes any of Aspects 1-8, wherein the second optical fibers define a physical contact reference line, and wherein when physical contact is made between the first optical fibers and the second optical fibers, if the physical contact reference lines of the first optical fibers and the second optical fibers are not aligned (e.g., parallel), axial contact force between the first optical fibers and the second optical fibers causes the holder end portion to move to bring the physical contact reference lines into alignment.

Aspect 10: Aspect 10 includes any of Aspects 1-9, wherein the optical fiber holder includes a head component and a base component, wherein the head component defines the holder end portion of the optical fiber holder, wherein the base component is configured to non-pivotally mount within the connector body of the fiber optic connector, and wherein the head component of the optical fiber holder can pivot relative to the base component of the optical fiber holder to modify the angle between the physical contact reference line and the central longitudinal axis of the connector body.

Aspect 11: Aspect 11 includes any of Aspects 1-10, wherein the head component of the optical fiber holder is coupled to the base component of the optical fiber holder by flexible beams that flex to allow the head component to pivot relative to the base component.

Aspect 12: Aspect 12 includes any of Aspects 1-10, wherein the base component of the optical fiber holder is a sleeve having a front end, and wherein the head component of the optical fiber holder pivotally mounts within the sleeve at the front end of the sleeve.

Aspect 13: Aspect 13 includes any of Aspects 1-12, and wherein the plurality of first optical fibers includes 2, 4, 8, 12, 16, 24, 32, 36 or more optical fibers.

Aspect 14: Aspect 14 includes any of Aspects 1-13, and wherein the holder end portion of the optical fiber holder moves (e.g., pivots) along a plane defined by the row of fiber end portions to adjust the angular orientation of the physical contact reference line.

What is claimed is:

1. A multi-fiber assembly comprising:
   a holder housing having a front end and an opposite rear end;
   a head portion of the holder housing being positioned at the front end of the holder housing, the head portion having a rear end and a front end, the head portion defining a plurality of optical fiber openings;
   a plurality of optical fibers received and secured within the optical fiber openings;
   flexible beams having forward ends coupled to the rear end of the head portion of the holder housing and rearward ends coupled to a main body portion of the holder housing, the flexible beams having lengths that extend between the head portion and the main body portion of the housing; and
   wherein the flexible beams are adapted to form a hinge arrangement that allows the head portion to angularly adjust relative to the main body portion.

2. The multi-fiber assembly of claim 1, wherein the hinge arrangement is configured such that when the head portion angularly adjusts relative to the main body portion, the head portion moves about an adjustment reference axis positioned in front of the head portion.

3. The multi-fiber assembly of claim 2, wherein the optical fibers include unsupported end portions that project forwardly from the head portion such that front tips of the unsupported end portions are positioned at least one millimeter in front of the head portion, and wherein the adjustment reference axis is forwardly offset from the head portion by a distance generally equal to a projection length of the unsupported end portions of the optical fibers.

4. The multi-fiber assembly of claim 1, wherein the holder housing includes two halves that each define a plurality of grooves for receiving the optical fibers.

5. The multi-fiber assembly of claim 4, wherein when the two halves are coupled together the plurality of grooves of the respective two halves oppose each other and cooperate to define the plurality of optical fiber openings.

6. The multi-fiber assembly of claim 4, wherein the two halves are secured together by a snap-fit connection interface.

7. The multi-fiber assembly of claim 1, wherein each one of the plurality of optical fiber openings has a center-to-center spacing of 200 or 250 microns.

8. The multi-fiber assembly of claim 1, wherein the main body portion of the holder housing, the head portion of the holder housing, and the flexible beams are integrally molded.

9. The multi-fiber assembly of claim 1, wherein the flexible beams converge as the flexible beams extend forwardly.

10. The multi-fiber assembly of claim 1, wherein the hinge arrangement allows the head portion of the holder housing to pivot at an angle of at least ¼ of a degree relative to the main body portion to adjust for an angular misalignment gap of at least 12 microns at tips of the optical fibers during optical connection with another set of optical fibers.

11. The multi-fiber assembly of claim 1, wherein the hinge arrangement allows the head portion of the holder housing to pivot at an angle of at least ½ of a degree relative to the main body portion to adjust for an angular misalignment gap of at least 23 microns at tips of the optical fibers during optical connection with another set of optical fibers.

12. The multi-fiber assembly of claim 1, wherein the hinge arrangement allows the head portion of the holder housing to pivot at an angle of at least 1 degree relative to the main body portion to adjust for an angular misalignment gap of at least 48 microns at tips of the optical fibers during optical connection with another set of optical fibers.

13. The multi-fiber assembly of claim 1, wherein the head portion defines a cutout for receiving epoxy to secure the optical fibers in the plurality of optical fiber openings.

14. A multi-fiber assembly adapted to be mounted in a ferrule-less connector, the multi-fiber assembly comprising:
a sleeve having a front end and an opposite rear end;
a front head disposed at the front end of the sleeve, the front head defining a plurality of optical fiber openings;
a plurality of optical fibers received within the optical fiber openings, wherein the optical fibers are fixed relative to the front head and include forward portions that project forwardly at least 1 millimeter front the front head; and
wherein the front head is adapted to pivot within the sleeve to correct any angular misalignment that may occur when the plurality of optical fibers make physical contact with other optical fibers.

15. The multi-fiber assembly of claim 14, wherein when the front head pivots relative to the sleeve, the front head moves about an adjustment reference axis positioned in front of the front head.

16. The multi-fiber assembly of claim 15, wherein the adjustment reference axis is forwardly offset from the head portion by a distance generally equal to a projection length of the forward portions of the optical fibers.

17. The multi-fiber assembly of claim 14, wherein the front head includes two halves that each define a plurality of grooves.

18. The multi-fiber assembly of claim 17, wherein when the two halves are coupled together the plurality of grooves of the respective two halves cooperate to form the plurality of optical fiber openings.

19. The multi-fiber assembly of claim 17, wherein the two halves are secured together by a snap-fit connection interface, an adhesive bonded interface or a welded interface.

20. The multi-fiber assembly of claim 14, wherein the front head has a front end and an opposite rear end, and wherein the front head has a body that tapers inwardly as the body extends in a direction from the front end toward the rear end.

21. The multi-fiber assembly of claim 14, wherein the front head pivots at an angle of at least 1 degree relative to the sleeve.

22. The multi-fiber assembly of claim 14, wherein the fiber holder pivots at an angle of no more than 5 degrees relative to the sleeve.

23. The multi-fiber assembly of claim 14, wherein the front head defines a cutout for receiving an adhesive filling material for securing the plurality of optical fibers in the plurality of optical fiber openings.

* * * * *